US012724292B2

(12) United States Patent
Akimoto et al.

(10) Patent No.: US 12,724,292 B2
(45) **Date of Patent: *Sep. 1, 2026**

(54) IMAGE DISPLAY DEVICE

(71) Applicant: NICHIA CORPORATION, Anan (JP)

(72) Inventors: Hajime Akimoto, Anan (JP); Hiroshi Miyairi, Yokohama (JP); Keiko Ono, Anan (JP); Masae Yamawaki, Anan (JP)

(73) Assignee: NICHIA CORPORATION, Anan (JP)

( * ) Notice: Subject to any disclaimer, the term of this patent is extended or adjusted under 35 U.S.C. 154(b) by 342 days.

This patent is subject to a terminal disclaimer.

(21) Appl. No.: 18/504,237

(22) Filed: Nov. 8, 2023

(65) Prior Publication Data

US 2024/0160036 A1 May 16, 2024

(30) Foreign Application Priority Data

Nov. 14, 2022 (JP) ................................ 2022-181965
Dec. 19, 2022 (JP) ................................ 2022-202359

(51) Int. Cl.
*G02B 30/56* (2020.01)
*G02B 5/124* (2006.01)
*G02B 26/08* (2006.01)

(52) U.S. Cl.
CPC ............ *G02B 30/56* (2020.01); *G02B 5/124* (2013.01); *G02B 26/0816* (2013.01)

(58) Field of Classification Search
CPC ..... G02B 30/56; G02B 5/124; G02B 26/0816
USPC .......................................................... 359/618
See application file for complete search history.

(56) References Cited

U.S. PATENT DOCUMENTS 11,892,572 B1 2/2024 Dunphy et al.
12,025,798 B1 7/2024 Dehkordi et al.
2010/0110384 A1 5/2010 Maekawa
2011/0074657 A1 3/2011 Sugiyama
2011/0235201 A1 9/2011 Maekawa
(Continued)

FOREIGN PATENT DOCUMENTS

JP 2009-042337 A 2/2009
JP 2013-238681 A 11/2013
(Continued)

OTHER PUBLICATIONS

U.S. Appl. No. 18/390,715, filed Dec. 20, 2023, Akimoto et al.
(Continued)

*Primary Examiner* — Stephone B Allen
*Assistant Examiner* — Boutsikaris Leonidas
(74) *Attorney, Agent, or Firm* — Foley & Lardner LLP

(57) ABSTRACT

An image display device includes an imaging element, a light source that forms a floating image, a position detecting part, a driver, and a controller. The imaging element includes a base member including a first surface, and a reflector array on the base member; or a base member comprising a reflector array and including a first surface. The reflector array includes multiple reflector rows including multiple dihedral corner reflectors along a first direction. The reflector rows are arranged parallel to a second direction crossing the first direction. The dihedral corner reflectors each include a first reflecting surface, and a second reflecting surface orthogonal to the first reflecting surface.

15 Claims, 27 Drawing Sheets

(56) References Cited

U.S. PATENT DOCUMENTS

| | | | | |
|---|---|---|---|---|
| 2015/0279283 | A1* | 10/2015 | Nakao | G09G 5/026 345/697 |
| 2018/0081058 | A1 | 3/2018 | Kalscheur | |
| 2018/0101087 | A1 | 4/2018 | Shinohara | |
| 2018/0164596 | A1 | 6/2018 | Houzyou et al. | |
| 2018/0203244 | A1* | 7/2018 | Hatanaka | G02B 5/136 |
| 2018/0267216 | A1 | 9/2018 | Otsubo | |
| 2019/0179160 | A1 | 6/2019 | Ito et al. | |
| 2019/0196020 | A1 | 6/2019 | Aceti et al. | |
| 2020/0290513 | A1 | 9/2020 | Karafin et al. | |
| 2021/0096393 | A1* | 4/2021 | Daiku | G02B 5/003 |
| 2021/0103161 | A1 | 4/2021 | Daiku | |
| 2021/0379993 | A1 | 12/2021 | Xu et al. | |
| 2022/0043277 | A1 | 2/2022 | Karafin et al. | |
| 2022/0155614 | A1* | 5/2022 | Kikuta | H04N 13/366 |
| 2022/0176869 | A1 | 6/2022 | Maruyama | |
| 2023/0035023 | A1* | 2/2023 | Kikuta | H04N 13/122 |
| 2023/0074490 | A1 | 3/2023 | Keum et al. | |
| 2023/0128022 | A1 | 4/2023 | Weindorf et al. | |
| 2024/0036353 | A1* | 2/2024 | Krauthamer | H04N 9/3155 |
| 2024/0184109 | A1 | 6/2024 | Kitahara et al. | |
| 2024/0210683 | A1 | 6/2024 | Aruga et al. | |
| 2024/0210684 | A1 | 6/2024 | Kitahara et al. | |
| 2024/0253465 | A1 | 8/2024 | Shintani et al. | |
| 2024/0355241 | A1* | 10/2024 | Kawanishi | G06T 5/80 |
| 2024/0361611 | A1* | 10/2024 | Daiku | G02B 30/56 |
| 2024/0427169 | A1 | 12/2024 | Daiku | |

FOREIGN PATENT DOCUMENTS

| | | | |
|---|---|---|---|
| JP | 2015-146009 | A | 8/2015 |
| JP | 2017-156466 | A | 9/2017 |
| JP | 2017-156467 | A | 9/2017 |
| JP | 2017-156468 | A | 9/2017 |
| WO | WO-2016/199902 | A1 | 12/2016 |
| WO | WO-2017/018204 | A1 | 2/2017 |
| WO | WO-2017/051598 | A1 | 3/2017 |
| WO | WO-2017/146172 | A1 | 8/2017 |

OTHER PUBLICATIONS

U.S. Appl. No. 18/392,314, filed Dec. 21, 2023, Hajime Akimoto.
U.S. Appl. No. 18/504,237, filed Nov. 8, 2023, Akimoto et al.
U.S. Appl. No. 18/508,974, filed Nov. 14, 2023, Akimoto et al.
U.S. Appl. No. 18/520,041, filed Nov. 27, 2023, Akimoto et al.
U.S. Appl. No. 18/526,318, filed Dec. 1, 2023, Akimoto et al.
U.S. Appl. No. 18/741,019, filed Jun. 12, 2024, Hajime Akimoto.
Notice of Allowance on U.S. Appl. No. 18/520,041 dated Apr. 9, 2025.
Non-Final Office Action in U.S. Appl. No. 18/390,715 dated May 30, 2025.
U.S. Appl. No. 18/493,167, filed Oct. 24, 2023, Nichia Corporation.
Non-Final Office Action in U.S. Appl. No. 18/508,974 dated Jan. 27, 2026.
Notice of Allowance in U.S. Appl. No. 18/392,314 dated Mar. 13, 2026.
Non-Final Office Action in U.S. Appl. No. 18/741,019 dated Apr. 8, 2026.

* cited by examiner 1112a
1124aS
1129
1128
1121a
1124a
1123
1122
1120a
1127
1126
1125
1180
Y1
X1
Z1
1181
1110
1182

IMAGE DISPLAY DEVICE

CROSS-REFERENCE TO RELATED APPLICATIONS

The present application claims priority under 35 U.S.C. § 119 to Japanese Patent Application No. 2022-181965, filed Nov. 14, 2022, and Japanese Patent Application No. 2022-202359, filed Dec. 19, 2022, the contents of which are hereby incorporated by reference in their entirety.

BACKGROUND

1. Technical Field

Embodiments described herein relate generally to an image display device.

2. Description of Related Art

A reflective imaging optical element that displays a real image of an object to be observed in mid-air and an image display device using the reflective imaging optical element have been proposed (see, e.g., Japanese Patent Publication No. 2015-146009).

Such an image display device can display an image when needed by a user, and not display the image at other times. Such an image display device requires no device for the display part because the image is displayed in mid-air. Such an image display device therefore has advantages such as more effective utilization of the limited space inside an automobile or the like.

A non-contact operation panel can be realized by applying such an image display device. Therefore, there are expectations for expanding the field of application beyond the utilization in automobiles and the like.

Reflective imaging optical elements that can display images in mid-air, such as those that use dihedral corner reflectors or optical elements having retroreflective functions called corner cube reflectors, have been put into practical use (see, e.g., WO 2016/199902 A). Attention has been called to problems resulting from operation principles of each. For example, in an image display reflector, it is said to be difficult to avoid the display of false images at locations unintended by the user.

In an image display device using a corner cube reflector, the formation position of the floating image can be set relatively freely by using an optical element in addition to a light source and imaging element. On the other hand, the configuration of such an optical element is complex.

An image display device having a simple structure that can display an image in mid-air is desirable.

SUMMARY

An embodiment of the invention provides an image display device having a simple structure that can display an image in mid-air.

An image display device according to an embodiment of the invention includes an imaging element forming a floating image; a light source irradiating, toward the imaging element, light forming the image; a position detecting part detecting an observation position of an observer observing the floating image; a driver modifying an orientation of an emission of light of at least one of the imaging element or the light source; and a controller controlling the driver to form the floating image according to the observation position. The imaging element comprises a base member, and a reflector array provided on the base member, the base member including a first surface and a second surface positioned at a side opposite to the first surface, or a base member comprising a reflector array, the base member including a first surface and a second surface positioned at a side opposite to the first surface. The reflector array includes a plurality of reflector rows, the plurality of reflector rows including a plurality of dihedral corner reflectors arranged along a first direction. Each of the plurality of dihedral corner reflectors includes a first reflecting surface configured to reflect light from the first surface side, and a second reflecting surface oriented to be orthogonal to the first reflecting surface and configured to reflect a reflected light from the first reflecting surface toward the first surface side. In each reflector row of the plurality of reflector rows, an angle between a straight line at which the first reflecting surface and the second reflecting surface meet and a plane in which the first direction and a second direction intersecting the first direction extend is set to a value greater than 0° or less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in the second direction.

An image display device according to an embodiment of the invention includes an imaging element forming a floating image; a light source irradiating, toward the imaging element, light forming the image; a position detecting part detecting an observation position of an observer observing the floating image; a driver modifying an orientation of an emission of light of at least one of the imaging element or the light source; and a controller controlling the driver to form the floating image according to the observation position. The imaging element includes a base member and a reflector array provided on the base member, the base member including a first surface and a second surface positioned at a side opposite to the first surface, or a base member comprising a reflector array provided in a base member, the base member including a first surface and a second surface, the second surface being positioned at a side opposite to the first surface. The reflector array includes a plurality of reflector rows, the plurality of reflector rows including a plurality of dihedral corner reflectors arranged along a first direction. The plurality of reflector rows are arranged in a second direction to be parallel to each other with a spacing therebetween, the second direction intersecting the first direction. The plurality of dihedral corner reflectors each include a first reflecting surface configured to reflect light from the first surface side, and a second reflecting surface orthogonal to the first reflecting surface and configured to reflect a reflected light reflected from the first reflecting surface toward the first surface side. In each reflector row of the plurality of reflector rows, an angle between a straight line at which the first reflecting surface and the second reflecting surface meet and a plane in which the first direction and the second direction intersect is set to a value greater than 0° and less than 90°. An angle between the first reflecting surface and the plane is set to a value greater than 45° and less than 90°. The plurality of reflector rows include a first reflector row in which the angle between the straight line and the plane is set to a smallest value among those of the plurality of reflector rows. The other reflector rows of the plurality of reflector rows are configured such that the angle between the straight line and the plane is set to values that increase away from the first reflector row in one direction along the second direction.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

DETAILED DESCRIPTION

Figure 1:
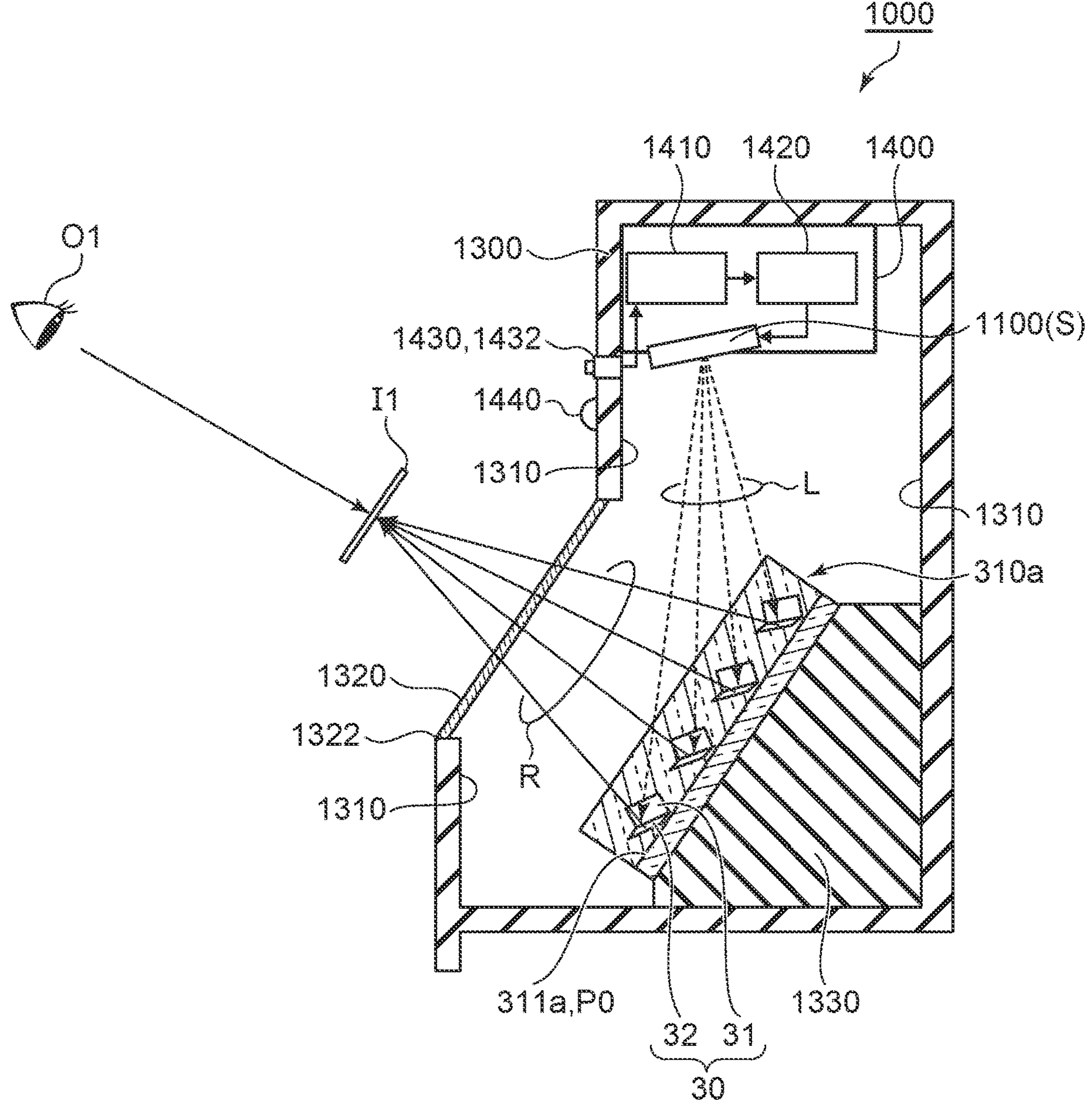
FIG. 1 is a schematic cross-sectional view illustrating an image display device according to a first embodiment.

Exemplary embodiments will now be described with reference to the drawings.

The drawings are schematic or conceptual, and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a repeated detailed description is omitted as appropriate.

First Embodiment

FIG. 1 is a schematic cross-sectional view illustrating an image display device according to a first embodiment.

As shown in FIG. 1, the image display device 1000 according to the embodiment includes an imaging element 310*a*, a display device 1100(S), a position detecting part 1430, a controller 1410, and a driver 1420. According to the first embodiment, the imaging element 310*a*, the display device 1100(S), the position detecting part 1430, the controller 1410, and the driver 1420 are located inside a housing 1300. An opening is provided in the housing 1300, and a window member 1320 is provided in the opening of the housing 1300.

In the image display device 1000, a light L that is emitted from the display device 1100(S), which is a light source, is reflected by the imaging element 310*a*. The light L is incident on the imaging element 310*a*, and the imaging element 310*a* emits a reflected light R. The reflected light R is emitted from the housing 1300 via the window member 1320 and forms a floating image I1 in mid-air outside the housing 1300.

The position at which the imaging element 310*a* is located in the image display device 1000 is fixed. In the image display device 1000, the position at which the display device 1100(S) is located can be modified, and the angle at which the display device 1100(S) emits the light can be modified. By appropriately modifying the position at which the display device 1100(S) is located and the angle at which the light is emitted, the image display device 1000 can form the floating image I1 at the desired position.

In the image display device 1000, the position detecting part 1430 detects the observation position at which an observer O1 observes the floating image I1 formed by the image display device 1000. The controller 1410 and the driver 1420 modify the position at which the floating image I1 is formed according to the observation position of the observer O1 detected by the position detecting part 1430. For example, the image display device 1000 modifies the position at which the floating image I1 is formed so that the observer O1 easily views the floating image I1.

More specifically, the position detecting part 1430 includes an imaging part 1432, and the imaging part 1432 images the observer O1 to include an image of a pupil of the observer O1. The imaging part 1432 generates image data including information related to the pupil position of the observer O1. The position detecting part 1430 detects the pupil position of the observer O1 based on the generated image data. The controller 1410 calculates the position at which the floating image I1 is formed and the optical path to the floating image I1 based on the detected position of the pupil of the observer O1, and generates a drive signal to form the floating image I1 at the calculated position. The driver 1420 modifies the position at which the display device 1100(S) is located and the orientation of the light emitted by the display device 1100(S) based on the drive signal.

The description above using FIG. 1 is a general concept of the flow of information, and the actual configuration of a control device 1400 includes a communication network described below using FIG. 16, etc. The descriptions of the other embodiments are similar. According to the first embodiment as described below with reference to FIG. 16, the position detecting part 1430 detects the pupil position of the observer O1 based on image data including the distance from the position detecting part 1430 to the observer O1 and information of the pupil position. The distance from the position detecting part 1430 to the observer O1 may be set by detecting the position of the seat in which the observer O1 sits. The distance from the position detecting part 1430 to the observer O1 may be set by the focus of image data, or may be set by providing multiple cameras and imaging the position detecting part 1430.

Figure 2:
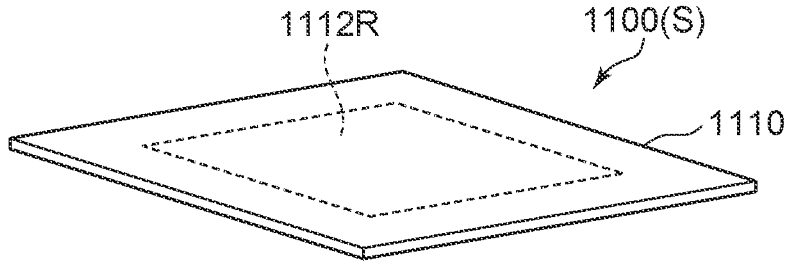
FIG. 2 is a schematic view for describing a range of movement of a portion, i.e., a display device, of the image display device according to the first embodiment.
Figure 2:
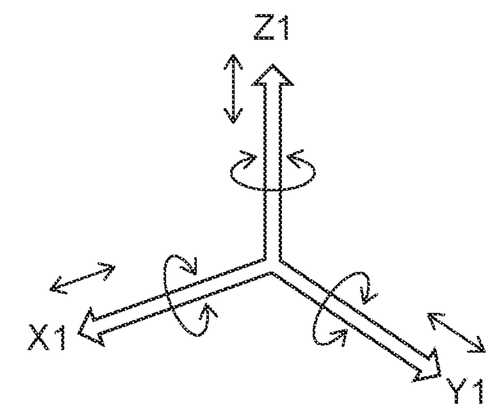

FIG. 2 is a schematic view for describing a portion, i.e., the range of movement of the display device, of the image display device according to the first embodiment.

As shown in FIG. 2, the display device 1100(S) is movable and is located at any position in X1Y1Z1 coordinates. The definitions of each axis of the three-dimensional coordinate axes are described below. The display device 1100(S) includes a substrate 1110, and a pixel formation region 1112R formed on the substrate 1110. The pixel formation region 1112R is formed in a plane parallel to the X1Y1-plane, and the main orientation of the light emitted by the LED elements included in the pixels formed in the pixel formation region 1112R is the negative direction of the Z1-axis.

As a first degree of freedom, the display device 1100(S) is movable in a direction parallel to the X1-axis. As a second degree of freedom, the display device 1100(S) is movable in a direction parallel to the Y1-axis. As a third degree of freedom, the display device 1100(S) is movable in the Z1-axial direction. By having the first to third degrees of freedom, the display device 1100(S) can move to any position in the X1Y1Z1 coordinate space.

The display device 1100(S) also can rotate around each axis. As a fourth degree of freedom, the display device 1100(S) is rotatable around the X1-axis. As a fifth degree of freedom, the display device 1100(S) is rotatable around the Y1-axis. As a sixth degree of freedom, the display device 1100(S) is rotatable around the Z1-axis. The pixel formation region 1112R of the display device 1100(S) can face any direction. The display device 1100(S) mainly emits light in the normal direction of the pixel formation region 1112R.

The control of the display device 1100(S) with six degrees of freedom is called six-axis control. In the image display device 1000, the controller 1410 and the driver 1420 are included in a control system adapted to six-axis control. For example, the driver 1420 that is adapted to six-axis control includes an articulated arm, and the display device 1100(S) is located at the tip of the articulated arm.

By including the controller 1410 and the driver 1420 adapted to six-axis control in the image display device 1000, the display device 1100(S) can emit light toward any position in any direction. The light that is emitted by the display device 1100(S) is irradiated on the imaging element 310*a*. By fixing the imaging element 310*a* and controlling the display device 1100(S) in six axes, the image display device 1000 can cause the light emitted from the display device 1100(S) to form a floating image at the desired position in mid-air via the imaging element 310*a*.

The description continues now by returning to FIG. 1.

According to the first embodiment, the controller 1410 and the driver 1420 are included in the control device 1400. For example, the controller 1410 and the driver 1420 are integrally included in the control device 1400, and the control device 1400 is located inside the housing 1300.

The controller 1410 includes, for example, an arithmetic processor (CPU). The controller 1410 calculates the position at which the floating image I1 is formed based on the pupil position of the observer O1 detected by the position detecting part 1430. When calculating the position at which the floating image I1 is formed, for example, the controller 1410 estimates the direction of the line of sight of the observer O1 based on the position of the pupil inside the image of the eye of the observer O1. The controller 1410 may use machine learning and/or deep learning when estimating the direction of the line of sight of the observer O1. For example, the information of the direction of the line of sight of the observer O1 also may be used in the luminance control of the floating image I1, etc. When the direction of the line of sight of the observer O1 is not oriented toward the floating image I1, the power consumption can be reduced by reducing the luminance of the display device 1100(S).

The imaging part 1432 is located at a position facing the observer O1. The imaging region of the imaging part 1432 is set to include information related to at least the positions of the eye and pupil of the observer O1.

Camera lighting 1440 may be provided to image the observer O1 more clearly. The camera lighting 1440 is lit when the imaging part 1432 images the observer O1. The image display device 1000 may be constantly lit when operating. For example, the operations of the imaging part 1432 and the camera lighting 1440 are controlled by the controller 1410.

The image display device 1000 further includes the housing 1300. The display device 1100(S), the control device 1400, and the imaging element 310*a* are located inside the housing 1300. According to the first embodiment, the display device 1100(S) and the control device 1400 are located at the upper portion inside the housing 1300, and the imaging element 310*a* is located at the lower portion of the housing 1300.

In the image display device 1000 of the first embodiment, the imaging element 310*a* is arranged so that a first surface 311*a* and a virtual plane P0 are tilted with respect to the bottom surface of the housing 1300. The light L that is emitted by the display device 1100(S) is incident on the imaging element 310*a*, and the imaging element 310*a* emits the light L obliquely upward as the reflected light R. The reflected light R is emitted in the normal direction of the first surface 311*a* and the virtual plane P0. The imaging element 310*a* is located at an imaging element mounting part 1330 and fixed to the imaging element mounting part 1330, which is provided to support the first surface 311*a* in the direction in which the reflected light R is emitted. The virtual plane P0 is described below with reference to FIG. 7.

The housing 1300 has any appropriate exterior shape such that the imaging element 310*a*, the display device 1100(S), the control device 1400, the imaging part 1432, and the camera lighting 1440 are located at appropriate positions in the interior. A portion of the imaging part 1432 and a portion of the camera lighting 1440 may be located outside the housing 1300, and the imaging part 1432 and the camera lighting 1440 are located at positions facing the observer O1 so that the observer O1 can be imaged and illuminated.

The housing 1300 includes a light-shielding member 1310. According to the first embodiment, the light-shielding member 1310 is a portion of the housing 1300. The light-shielding member 1310 is, for example, a light-absorbing layer located at the interior wall of the housing 1300. The light-absorbing layer is, for example, a coating layer of a black coating material. By providing the light-shielding member 1310 at the interior wall of the housing 1300 in the image display device 1000, a portion of the light emitted from the display device 1100(S) and the imaging element 310*a* is prevented from being reflected inside the housing 1300 to become stray light. The light-shielding member 1310 is a coating layer of a coating material and is sufficiently thin compared to the thickness of the constituent material of the housing 1300, and is therefore illustrated as the surface of the interior wall of the housing 1300 in FIG. 1.

The window member 1320 is provided in a portion of the housing 1300. The window member 1320 is located at the position of a window 1322, which is an opening formed in a portion of the housing 1300. The window 1322 is an opening at a position facing the first surface 311*a* of the imaging element 310*a*. The window member 1320 is formed of a light-transmitting material such as glass, a transparent resin, etc., so that the imaging element 310*a* can emit the reflected light R outside the image display device 1000.

The imaging element 310*a* includes multiple dihedral corner reflectors 30 arranged in a matrix configuration on the first surface 311*a*. The first surface 311*a* is arranged to be substantially parallel to the window member 1320 and the opening of the window 1322. The dihedral corner reflector 30 includes a first reflecting surface 31 and a second reflecting surface 32, the reflecting surfaces reflect the light once each, and the twice-reflected light of the dihedral corner reflector 30 is emitted as the reflected light R. The configuration of the imaging element 310*a* is described below with reference to FIGS. 6 to 15. The window member 1320 and the window 1322 are arranged to transmit the twice-reflected light of the imaging element 310*a*.

According to the first embodiment, the display device 1100(S) and the imaging element 310*a* are arranged to form the floating image I1 directly above the imaging element 310*a*. "Directly above the imaging element 310*a*" is a position in the normal direction of the first surface 311*a*. In such an arrangement, there are cases where the imaging element 310*a* also emits a portion of the once-reflected light toward the first surface 311*a* side and forms false images and/or ghosts at the first surface 311*a* side. According to the configuration of the imaging element 310*a*, there are also cases where light that is not reflected by any reflecting surface is emitted toward the first surface 311*a* side. Accordingly, the light-shielding member 1310 is located at the interior wall of the housing 1300 at positions that shield at least the leakage light from the display device 1100(S) and the light other than the twice-reflected light of the imaging element 310*a*.

The reflected light R that is emitted from the imaging element 310*a* passes through the window member 1320 and forms the floating image I1 outside the housing 1300. The window member 1320 is located between the imaging element 310*a* and the position at which the floating image I1 is formed. When the observer O1 is present, the floating image I1 is formed between the observer O1 and the window member 1320.

Although the light-shielding member 1310 is located at the interior wall of the housing 1300 in the specific example above, the light-shielding member 1310 is not limited to being located at the interior wall as long as the leakage light radiated from the display device 1100(S) or the imaging element 310*a* can be shielded. For example, the leakage light from the display device 1100(S) can be shielded by surrounding the periphery of the display device 1100(S) with a tubular body coated in black. The leakage light of the imaging element 310*a* can be shielded by forming the base member of the imaging element 310*a* from a black resin, etc.

Figure 3A:
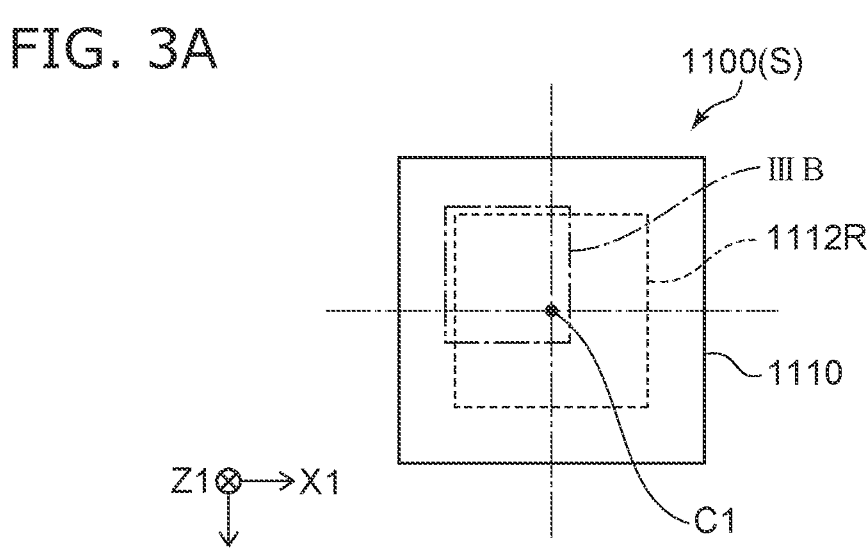
FIG. 3A is a schematic plan view illustrating a portion, i.e., the display device, of the image display device according to the first embodiment.

The configuration of the display device 1100(S) will now be described in detail. FIG. 3A is a schematic plan view illustrating a portion, i.e., the display device, of the image display device according to the first embodiment.

Figure 3B:
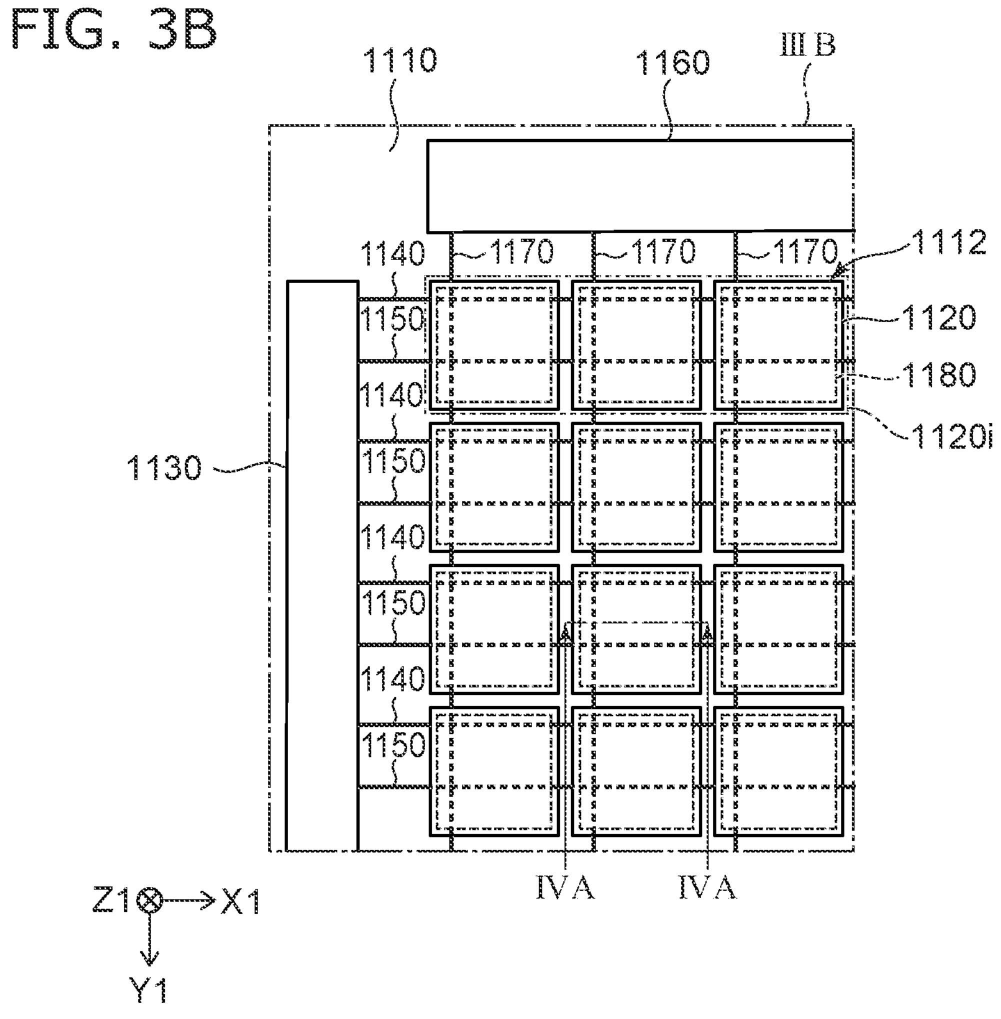
FIG. 3B is an enlarged schematic view of portion IIIB of FIG. 3A.

FIG. 3B is an enlarged schematic view of portion IIIB of FIG. 3A.

Figures 4A, 4B:
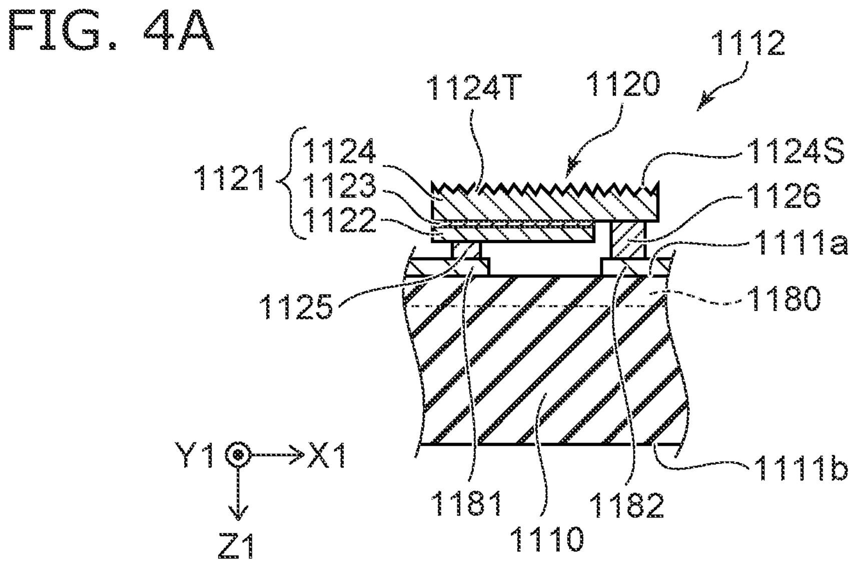
FIG. 4A is a schematic auxiliary cross-sectional view along line IVA-IVA of FIG. 3B.
FIG. 4B is a schematic cross-sectional view illustrating a portion, i.e., a modification of the display device, of the image display device according to the first embodiment.

FIG. 4A is a schematic auxiliary cross-sectional view along line IVA-IVA of FIG. 3B.

A three-dimensional orthogonal coordinate system may be used in the description of the display device 1100(S). The three-dimensional orthogonal coordinate system for the description of the display device 1100(S) is an orthogonal coordinate system including an X1-axis, a Y1-axis, and a Z1-axis. A direction parallel to the X1-axis may be called an "X1-direction," a direction parallel to the Y1-axis may be called a "Y1-direction," and a direction parallel to the Z1-axis may be called a "Z1-direction". The X1Y1-plane that includes the X1-axis and the Y1-axis is parallel to a first surface 1111*a* of the substrate of the display device 1100(S). The first surface 1111*a* is a surface at which the LED elements are arranged and the pixel formation region 1112R is located. The X1-axis is parallel to the rows of pixels of the display device 1100(S). The Y1-axis is orthogonal to the X1-axis. The Z1-axis is orthogonal to the X1-axis and the Y1-axis and is the positive direction from the first surface 1111*a* toward a second surface 1111*b*. The second surface 1111*b* is positioned at the side opposite to the first surface 1111*a* of the substrate 1110.

According to the X1Y1Z1-orthogonal coordinate system, the display device 1100(S) emits light mainly in the negative direction of the Z1-axis. As shown in FIG. 1, the imaging element 310*a* is located at the side at which the display device 1100(S) emits light. That is, the imaging element 310*a* is located at the negative Z1-axis side of the display device 1100(S).

As shown in FIG. 3A, the display device 1100(S) includes the substrate 1110 that is substantially rectangular when the X1Y1-plane is viewed in plan. The substrate 1110 can be, for example, glass, a resin such as polyimide or the like, or a Si substrate may be used. In the display device 1100(S), an optical axis C1 is aligned with the center of the shape of the outer perimeter of the substrate 1110 when the X1Y1-plane is viewed in plan. The optical axis C1 is parallel to the Z1-axis. By aligning the optical axis C1 with the Z1-axis, the display device 1100(S) can be rotated around the optical axis C1 by six-axis control.

The pixel formation region 1112R is located on the substrate 1110 with the optical axis C1 at the center. Pixels 1112 shown in FIG. 3B are arranged in a matrix configuration in the pixel formation region 1112R. Although the pixel formation region 1112R is substantially square in the example shown in FIG. 3A, the pixel formation region 1112R can have any shape. That is, the outer perimeter formed by the arrangement of the pixels 1112 can have any shape.

As shown in FIG. 3B, the display device 1100(S) includes the multiple pixels 1112 as a light source. The display device 1100(S) uses the multiple pixels 1112 to display the desired image. The display device 1100(S) is electrically connected to a not-illustrated display controller. The display controller is located inside the housing 1300 and/or outside the housing 1300 and supplies, to the display device 1100(S), data related to the image to be displayed by the display device 1100(S). The display device 1100(S) displays a still image, a video image, etc., based on the data related to the image supplied from the display controller.

The display device 1100(S) includes the substrate 1110, the multiple pixels 1112, a scanning circuit 1130, multiple scanning lines 1140, multiple lighting control lines 1150, a drive circuit 1160, and multiple signal lines 1170. The pixel 1112 includes LED elements 1120 and individual circuits 1180. The LED elements 1120, the scanning circuit 1130, the drive circuit 1160, and the individual circuits 1180 are shown simply as quadrilaterals to avoid complexity in the illustration of FIG. 3B.

The multiple LED elements 1120 are arranged in a matrix configuration. Hereinbelow, the multiple LED elements 1120 arranged in one row in the X1-direction are called the "row 1120*i*".

As shown in FIG. 4A, the substrate 1110 includes the first surface 1111*a* and the second surface 1111*b*. The second surface 1111*b* is at the side opposite to the first surface 1111*a*. The LED elements 1120 are arranged in a matrix configuration on the first surface 1111*a*. The LED elements 1120 are mounted face-down on the first surface 1111*a*. The LED elements are not limited to face-down mounting and may be mounted face-up on the first surface 1111*a*.

The LED element 1120 includes a semiconductor stacked body 1121, an anode electrode 1125, and a cathode electrode 1126. The semiconductor stacked body 1121 includes a p-type semiconductor layer 1122, an active layer 1123 located on the p-type semiconductor layer 1122, and an n-type semiconductor layer 1124 located on the active layer 1123. The semiconductor stacked body 1121 includes, for example, a gallium nitride compound semiconductor of $In_XAl_YGa_{1-X-Y}N$ ($0 \leq X$, $0 \leq Y$, and $X+Y<1$). According to the embodiment, the light that is emitted by the LED element 1120 is visible light.

The anode electrode 1125 is electrically connected to the p-type semiconductor layer 1122. The anode electrode 1125 also is electrically connected to a wiring part 1181 of the individual circuit 1180 described below with reference to FIG. 5. In the example shown in FIGS. 4A and 4B, the individual circuit 1180 is formed in a Si substrate. The cathode electrode 1126 is electrically connected to the n-type semiconductor layer 1124. The cathode electrode 1126 also is electrically connected to another wiring part 1182 of the individual circuit 1180. The anode electrode 1125 and the cathode electrode 1126 can include, for example, metal materials.

In the example shown in FIG. 4A, multiple recesses 1124T are provided in a light-emitting surface 1124S of the LED element 1120. Hereinbelow, "the light-emitting surface of the LED element" means the surface of the LED element from which the light is mainly emitted. In the example shown in FIG. 4A, the light-emitting surface 1124S is one surface of the n-type semiconductor layer 1124. More specifically, the light-emitting surface 1124S is positioned at the side of the n-type semiconductor layer 1124 opposite to the surface facing the active layer 1123.

Methods of forming the multiple recesses 1124T in the light-emitting surface 1124S include a method in which an n-type semiconductor layer is grown on a growth substrate in which protrusions are formed, a method in which surface roughening of the surface of the n-type semiconductor layer is performed by anisotropic etching, etc. The growth substrate may be detached at the prescribed timing.

Thus, the LED element 1120 can emit light having a larger light distribution angle because the multiple recesses 1124T are provided in the light-emitting surface 1124S of the LED element 1120.

The configuration of the LED element is not limited to the configuration described above. For example, multiple protrusions instead of multiple recesses may be provided in the light-emitting surface of the LED element, or both multiple recesses and multiple protrusions may be provided. When the growth substrate is light-transmissive, the growth substrate may not be detached from the semiconductor stacked body, and at least one of multiple recesses or multiple protrusions may be provided in the surface of the growth substrate corresponding to the light-emitting surface.

The structure of the display device 1100(S) is not limited to the structure described above. Although the LED elements 1120 are individually mounted on the substrate 1110 in which the individual circuits 1180 are provided in the example above, the LED elements 1120 may be individually patterned from a semiconductor stacked body bonded on the substrate 1110 in which the individual circuits 1180 are provided, and then wired.

FIG. 4B is a schematic cross-sectional view illustrating a portion, i.e., a modification of the display device, of the image display device according to the first embodiment.

FIG. 4B corresponds to an auxiliary cross-sectional view along line IVA-IVA of FIG. 3B, and is an auxiliary cross-sectional view at the same position as the position shown in FIG. 4A.

As shown in FIG. 4B, a pixel 1112*a* includes an LED element 1120*a* and a wavelength conversion member 1128.

Similarly to the pixel 1112 shown in FIG. 3B, the pixel 1112*a* includes the individual circuit 1180. As in the example shown in FIG. 4B, the pixel 1112*a* may further include a color filter 1129.

According to the modification, the LED element 1120*a* includes a semiconductor stacked body 1121*a*, the anode electrode 1125, and the cathode electrode 1126. The semiconductor stacked body 1121*a* includes the p-type semiconductor layer 1122, the active layer 1123, and an n-type semiconductor layer 1124*a*. The active layer 1123 is located on the p-type semiconductor layer 1122, and the n-type semiconductor layer 1124*a* is located on the active layer 1123. The n-type semiconductor layer 1124*a* includes a light-emitting surface 1124*a*S. The light-emitting surface 1124*a*S is a flat surface that does not include recesses or protrusions.

In the pixel 1112*a*, a protective layer 1127 covers the LED element 1120*a*, the wiring parts 1181 and 1182, and the first surface 1111*a* of the substrate 1110. The protective layer 1127 can include, for example, a light-transmitting material such as a polymer material including a sulfur (S)-including substituent group or phosphorus (P) atom-including group, a high refractive index nanocomposite material in which high refractive index inorganic nanoparticles are introduced to a polymer matrix of polyimide, etc.

The wavelength conversion member 1128 is located on the protective layer 1127. The wavelength conversion member 1128 includes at least one type of wavelength conversion material such as a general fluorescer material, a perovskite fluorescer material, a quantum dot (QD), etc. The light that is emitted from the LED element 1120*a* is incident on the wavelength conversion member 1128. The wavelength conversion material that is included in the wavelength conversion member 1128 converts the light into light of a different peak wavelength from the light emitted from the LED element 1120*a*, and emits the light. The light that is incident on the wavelength conversion member 1128 is scattered inside the wavelength conversion member 1128; therefore, the light that is emitted by the wavelength conversion member 1128 is emitted with a wider light distribution angle.

The color filter 1129 is located on the wavelength conversion member 1128. The color filter 1129 can shield the greater part of the light that is emitted from the LED element 1120*a* but does not undergo wavelength conversion by the wavelength conversion member 1128. As a result, the light that is emitted by the wavelength conversion member 1128 is the main light emitted from the pixel 1112*a*.

According to the modification, the light emission peak wavelength of the LED element 1120*a* may be in the ultraviolet region or the visible light region. When blue light is to be emitted from at least one pixel 1112*a*, blue light may be emitted from the LED element 1120*a* belonging to the pixel 1112*a* without providing the wavelength conversion member 1128 and the color filter 1129 in the pixel 1112*a*.

In the LED element, an n-type semiconductor layer may be provided to face a substrate, an active layer and a p-type semiconductor layer may be stacked in this order on the n-type semiconductor layer, and the surface of the p-type semiconductor layer at the side opposite to the surface facing the active layer may be used as the light-emitting surface of the LED element.

As shown in FIG. 3B, for example, the scanning circuit 1130 is provided in the substrate 1110 to be adjacent to the multiple LED elements 1120, which are arranged in a matrix configuration, in the X1-direction when viewed in plan. That is, the scanning circuit 1130 is located adjacent to the outer edge parallel to the X1-direction of the pixel formation region 1112R shown in FIG. 2. The scanning circuit 1130 is configured to sequentially switch, in the Y1-direction, the row 1120*i* that is driven. The multiple scanning lines 1140 extend in the X1-direction from the scanning circuit 1130. The multiple lighting control lines 1150 extend in the X1-direction from the scanning circuit 1130. The multiple scanning lines 1140 and the multiple lighting control lines 1150 are alternately arranged in the Y1-direction.

The drive circuit 1160 is provided in the substrate 1110 to be adjacent to the multiple LED elements 1120, which are arranged in the matrix configuration, in the Y1-direction when the X1Y1-plane is viewed in plan. That is, the drive circuit 1160 is located adjacent to the outer edge parallel to the Y1-direction of the pixel formation region 1112R shown in FIG. 2. The drive circuit 1160 is configured to control the outputs of the LED elements 1120 belonging to the row 1120*i* that is driven. The multiple signal lines 1170 extend in the Y1-direction from the drive circuit 1160. The multiple signal lines 1170 are arranged in the X1-direction. The drive circuit 1160 may include an IC chip, and the IC chip may be mounted on the substrate 1110.

For example, the scanning circuit 1130, the multiple scanning lines 1140, the multiple lighting control lines 1150, the drive circuit 1160, the multiple signal lines 1170, and the individual circuits 1180 may be formed on the substrate 1110 by a low-temperature polysilicon (LTPS) process.

In the example, one pixel 1112 includes one individual circuit 1180 and one LED element 1120. Multiple LED elements 1120 may be included in one pixel 1112. When multiple LED elements 1120 are included in one pixel 1112, one individual circuit may correspond to multiple LED elements. Or, the individual circuits 1180 may be provided for each LED element 1120 in one pixel 1112.

Figure 5:
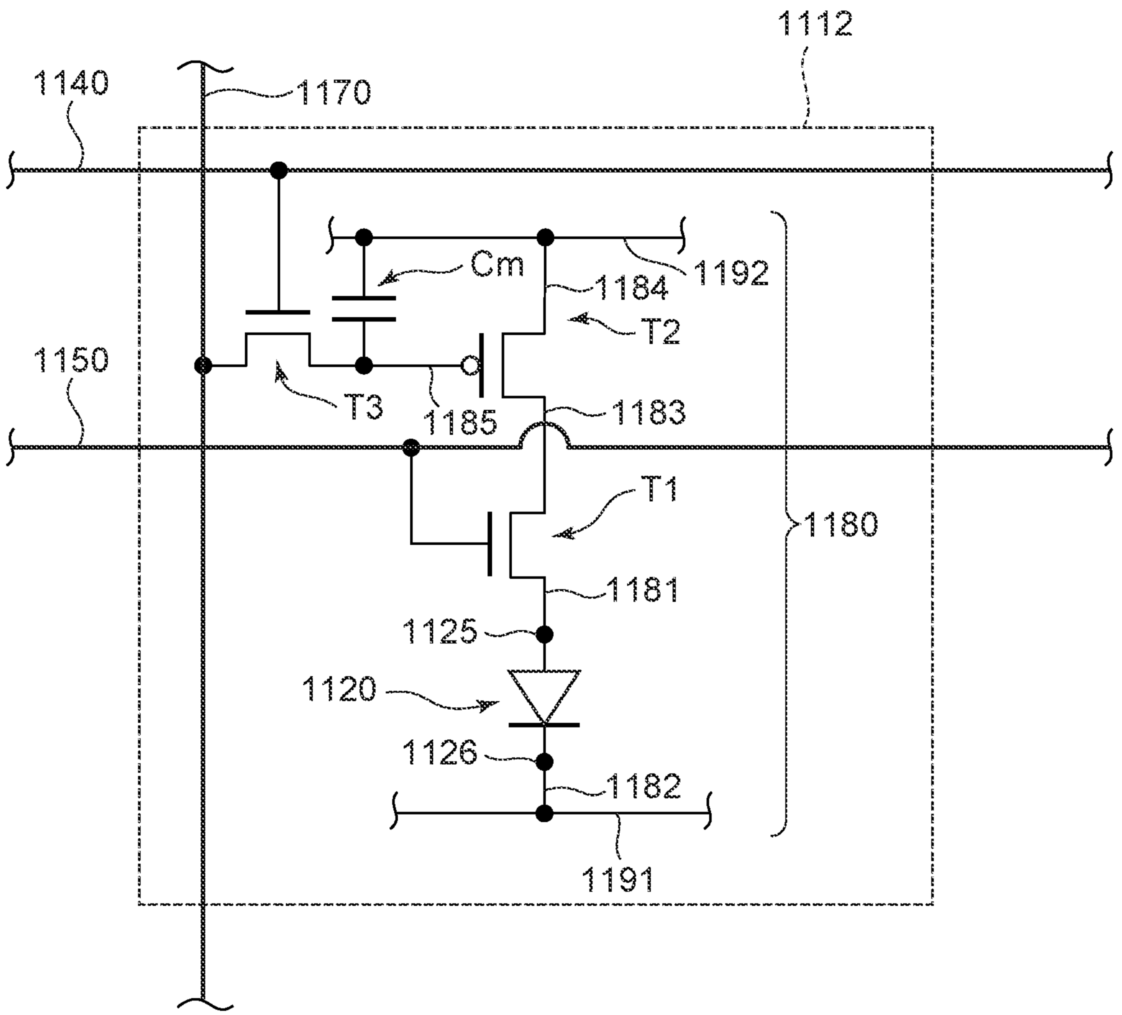
FIG. 5 is a schematic equivalent circuit diagram illustrating a portion, i.e., the display device, of the image display device according to the first embodiment.

FIG. 5 is a schematic equivalent circuit diagram illustrating a portion, i.e., the display device, of the image display device according to the first embodiment.

As shown in FIG. 5, the individual circuit 1180 includes a first transistor T1, a second transistor T2, a third transistor T3, a capacitor Cm, and multiple wiring parts 1181 to 1185. The first transistor T1 and the third transistor T3 are n-channel MOSFETs. The second transistor T2 is a p-channel MOSFET.

The cathode electrode 1126 of the LED element 1120 is electrically connected to a ground line 1191 via the wiring part 1182. For example, a voltage that is used as a reference is applied to the ground line 1191. The anode electrode 1125 of the LED element 1120 is electrically connected to the source electrode of the first transistor T1 via the wiring part 1181.

The gate electrode of the first transistor T1 is electrically connected to the lighting control line 1150. The drain electrode of the first transistor T1 is electrically connected to the drain electrode of the second transistor T2 via a wiring part 1183. The source electrode of the second transistor T2 is electrically connected to a power supply line 1192 via a wiring part 1184. A sufficiently higher voltage than the voltage used as the reference is applied to the power supply line 1192. Although not illustrated, a DC power supply is connected to the power supply line 1192 and the ground line 1191, and a positive DC voltage with respect to the reference voltage applied to the ground line 1191 is applied between the power supply line 1192 and the ground line 1191.

The gate electrode of the second transistor T2 is electrically connected to the drain electrode of the third transistor T3 via the wiring part 1185. The source electrode of the third transistor T3 is electrically connected to the signal line 1170.

The gate electrode of the third transistor T3 is electrically connected to the scanning line 1140.

The wiring part 1185 is electrically connected to one terminal of the capacitor Cm. The other terminal of the capacitor Cm is electrically connected to the power supply line 1192.

The scanning circuit 1130 selects one row among the multiple rows 1120*i* and outputs an on-signal to the scanning line 1140 electrically connected to the row 1120*i*. As a result, the third transistors T3 of the individual circuits 1180 corresponding to the row 1120*i* are in a state in which the third transistors T3 can be switched on. The drive circuit 1160 outputs, to the signal lines 1170, drive signals including drive signal voltages corresponding to the set outputs of the LED elements 1120 belonging to the row 1120*i*. As a result, the drive signal voltages are stored in the capacitors Cm. The drive signal voltages set the second transistors T2 of the individual circuits 1180 corresponding to the row 1120*i* to a state in which the second transistor T2 can be switched on.

The scanning circuit 1130 outputs, to the lighting control line 1150 electrically connected to the row 1120*i*, a control signal that sequentially switches the first transistors T1 of the row 1120*i* on and off. When the first transistors T1 are in the on-state, the light emission luminances of the LED elements 1120 are controlled by currents corresponding to the drive signal voltages stored in the capacitors Cm flowing in the LED elements 1120 belonging to the row 1120*i*. The light emission periods of the LED elements 1120 are controlled for each row 1120*i* by switching the first transistors T1 on and off.

The scanning circuit 1130 sequentially switches, in the Y1-direction, the scanning line 1140 outputting the on-signal and the lighting control line 1150 outputting the control signal. Accordingly, the row 1120*i* that is driven is sequentially switched in the Y1-direction.

The configurations of the scanning circuit, the multiple scanning lines, the multiple lighting control lines, the drive circuit, the multiple signal lines, the multiple individual circuits, etc., are not limited to those described above. For example, the individual circuit may be made of a second transistor, a third transistor, a capacitor, and wiring parts without including a first transistor; multiple scanning lines may extend from the scanning circuit; a lighting control line may not be provided. The scanning lines, the lighting control lines, the signal lines, the wiring parts of the individual circuits, etc., may not be on the surface of the substrate, and may be provided in the substrate. The electrical elements such as the transistors, capacitors, and the like included in the drive circuit may be separately manufactured and then mounted on the substrate instead of being formed on the substrate. Instead of separately manufacturing the LED elements and then mounting to the substrate, the LED elements may be formed on the substrate by using a semiconductor material such as Si or the like as the substrate. In such a case, each transistor element may be a silicon semiconductor element provided on the silicon substrate instead of a low-temperature polysilicon element provided on the glass substrate.

The display device that includes the LED element as described above is favorable in that a sufficient light emission luminance is realized with low power consumption; however, the display device is not limited thereto. Instead of an LED display using an LED element such as that described above, the display device may be an OLED display, a liquid crystal display, etc.

A configuration of the imaging element 310*a* will now be described in detail.

Figure 6:
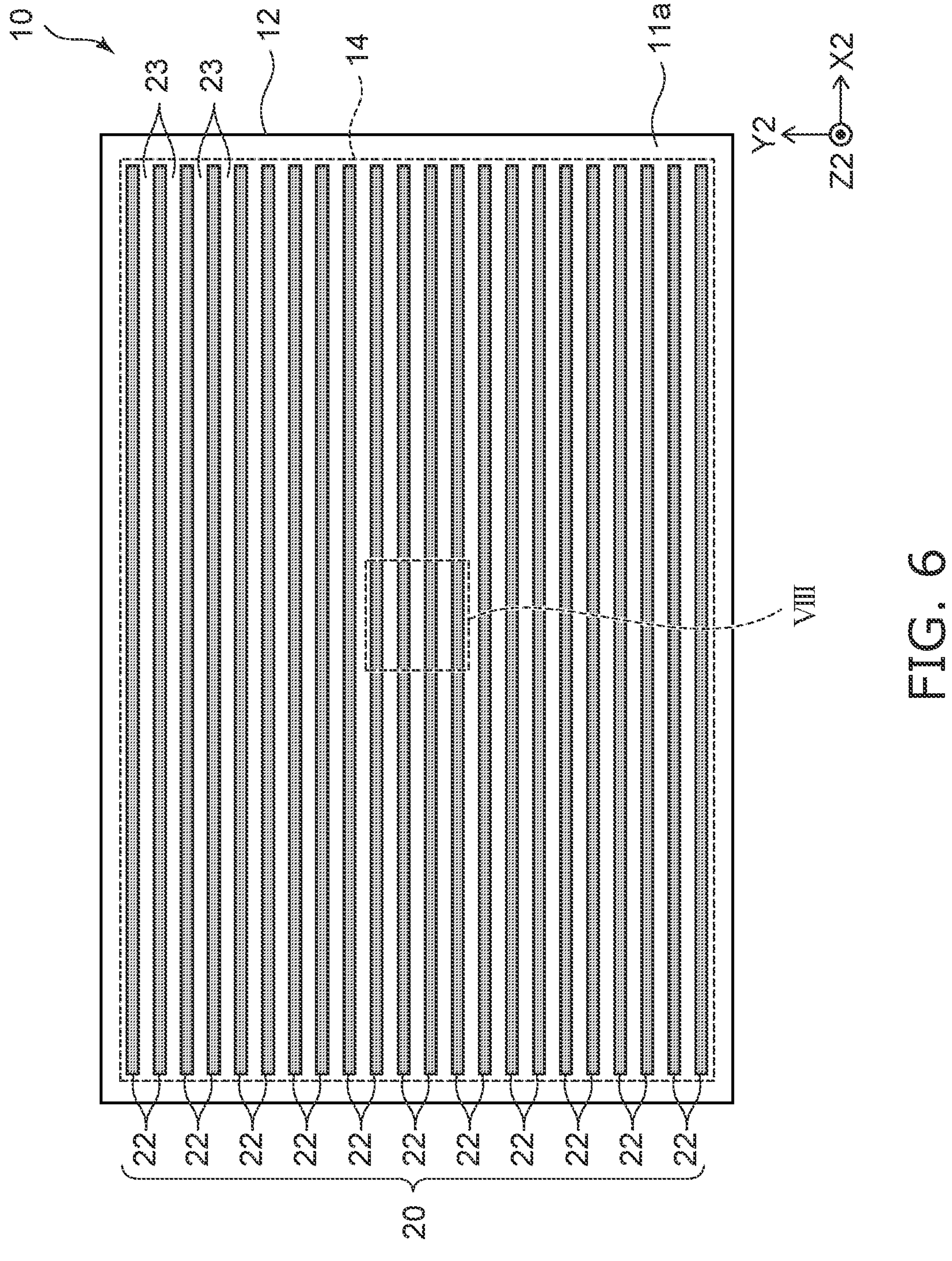
FIG. 6 is a schematic plan view illustrating a portion, i.e., an imaging element, of the image display device.

FIG. 6 is a schematic plan view illustrating a portion, i.e., the imaging element, of the image display device.

As shown in FIG. 1, the image display device 1000 according to the embodiment includes the imaging element 310*a*. The imaging element 310*a* shown in FIG. 1 is one of many variations of imaging element configurations. The following description includes the operation principle of the imaging element forming the floating image in mid-air. First, the configuration and operation of an imaging element 10 will be described.

As shown in FIG. 6, the imaging element 10 includes a base member 12 and a reflector array 20. The base member 12 includes a first surface 11*a*, and the reflector array 20 is provided on the first surface 11*a*. In the example shown in FIG. 6, the reflector array 20 is provided inside a reflector formation region 14 of the first surface 11*a*. The reflector array 20 includes multiple reflector rows 22. The reflector array 20 may be provided in the base member 12. That is, the reflector array 20 and the base member 12 may be formed as a continuous body. In such a case, the first surface 11*a* of the base member 12 is the dihedral corner reflectors of the reflector array 20 described below.

A configuration of the base member 12 will now be described.

Figure 7:
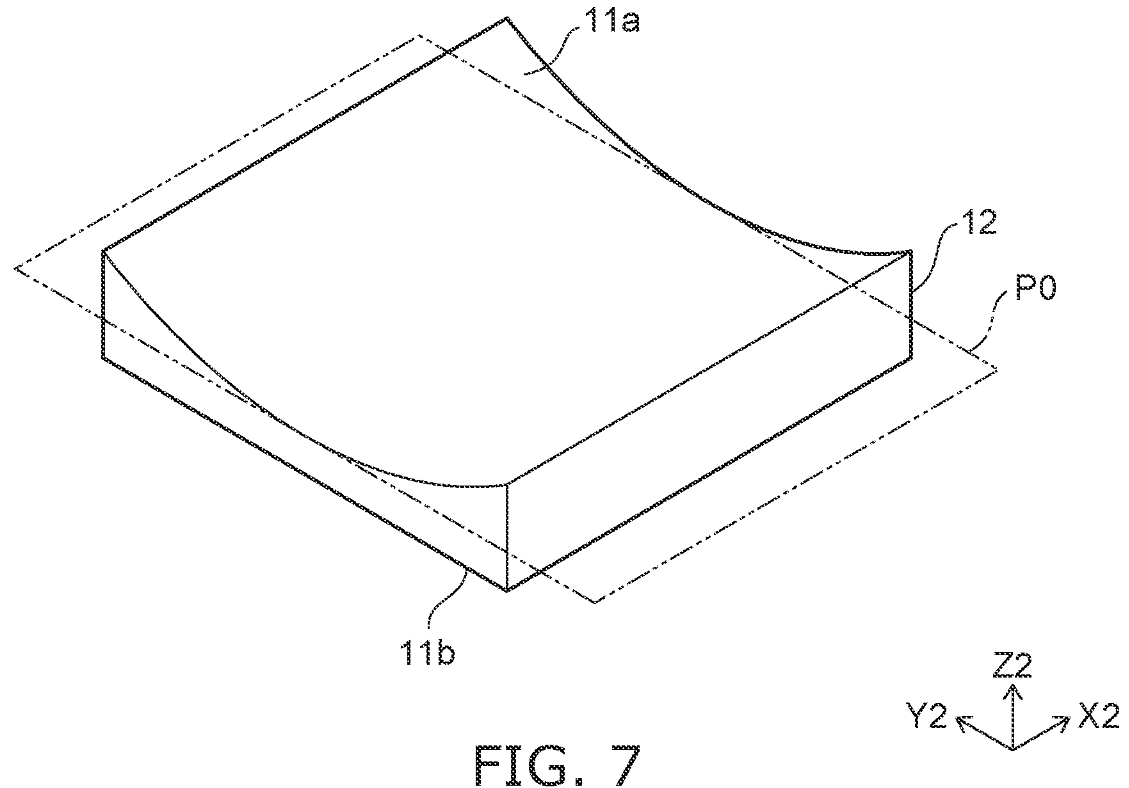
FIG. 7 is a schematic perspective view illustrating a portion, i.e., a base member, of the imaging element of FIG. 6.

FIG. 7 is a schematic perspective view illustrating a portion, i.e., the base member, of the imaging element of FIG. 6.

As shown in FIG. 7, the base member 12 includes the first surface 11*a* and a second surface 11*b*. The second surface 11*b* is positioned at the side opposite to the first surface 11*a*.

The three-dimensional orthogonal coordinate system used in the description of the imaging element may be different from the three-dimensional orthogonal coordinate system of the description of the display device 1100(S) shown in FIG. 3A, etc. The three-dimensional orthogonal coordinate system for the description of the imaging element is an orthogonal coordinate system including an X2-axis, a Y2-axis, and a Z2-axis. A direction parallel to the X2-axis may be called the "X2-direction," a direction parallel to the Y2-axis may be called the "Y2-direction," and a direction parallel to the Z2-axis may be called the "Z2-direction". The X2Y2-plane that includes the X2-axis and the Y2-axis is defined as a plane parallel to the virtual plane P0. The first surface 11*a* is located at the positive Z2-axis side of the second surface 11*b*. The first surface 11*a* includes a portion of a circular arc that is convex toward the negative Z2-axis side when the Y2Z2-plane is viewed in plan. In the specific example below, the virtual plane P0 is a virtual surface parallel to a tangent plane contacting a point on the circular arc positioned furthest in the negative direction of the Z2-axis.

As described above, the first surface 11*a* is a curved surface, and the reflector array 20 is located on the curved surface. The virtual plane P0 is used as a reference surface when setting the tilt in the Y2-axial direction of the reflector row 22. In other words, the reflector row 22 is arranged on the first surface 11*a* at an angle set with respect to the virtual plane P0.

The base member 12 is formed of a light-transmitting material and is formed of, for example, a transparent resin.

In the imaging element 10, when the light source is located at the first surface 11*a* side when referenced to the base member 12, the floating image is formed not at the second surface 11*b* side, but at the first surface 11*a* side at which the light source is located. The position at which the floating image is formed can be different from the position at which the light source is located and sufficiently separated from the position at which the light source is located.

The description continues now by returning to FIG. 6.

The reflector row 22 extends along the X2-direction. The multiple reflector rows 22 are arranged to be substantially parallel to each other along the Y2-direction. The multiple reflector rows 22 are arranged at substantially uniform spacing with a spacing 23 interposed in the Y2-direction respectively between the adjacent reflector rows 22. The length in the Y2-direction of the spacing 23 of the reflector rows 22 can be any length and can be, for example, about the length in the Y2-direction of the reflector row 22. When the light source is located at the first surface 11*a* side, light rays that are not reflected by the reflector rows 22, reflected light that is reflected once by the reflector row 22, and the like are incident on the region in which the spacing 23 of the reflector rows 22 is formed. Such light rays do not contribute to the floating image; therefore, the ratio of the light rays incident on the imaging element 10 that contribute to the floating image decrease as the spacing 23 increases. Therefore, the length in the Y2-direction of the spacing 23 is set to an appropriate length according to the efficiency of the reflecting surfaces, the dimensions of the dihedral corner reflector described below with reference to FIG. 8, etc.

Each of the reflector rows 22 includes many dihedral corner reflectors connected in the X2-direction and is therefore shown as filled-in to avoid complexity in FIG. 6. In the example shown in FIG. 6, the imaging element 10 has a laterally-long shape in the X2-direction. This is because the shape is advantageous for binocular viewing of the floating image. The shape of the imaging element 10 when the X2Y2-plane is viewed in plan is not limited thereto, and a longitudinally-long shape in the Y2-direction may be selected according to the application.

When a mid-air image is formed in the normal direction of the first surface 311*a* of the imaging element 310*a* as in the image display device 1000 shown in FIG. 1, the spacing of the adjacent reflector rows 22 may not be provided. When the spacing of the adjacent reflector rows 22 is provided, the spacing of the reflector rows may be a reflecting surface.

Figure 8:
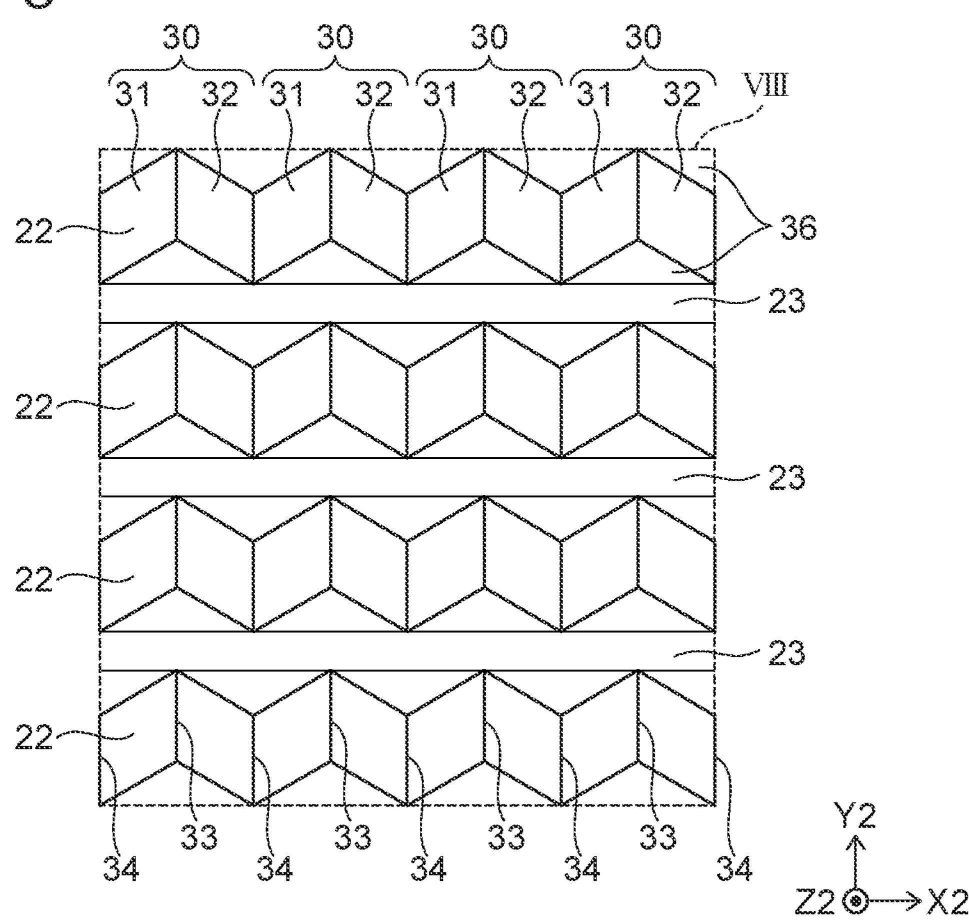
FIG. 8 is an enlarged schematic view of portion VIII of FIG. 6.

FIG. 8 is an enlarged schematic view of portion VIII of FIG. 6.

As shown in FIG. 8, the reflector row 22 includes the multiple dihedral corner reflectors 30. The multiple dihedral corner reflectors 30 are connected to each other along the X2-direction and are provided continuously. The dihedral corner reflector 30 includes the first reflecting surface 31 and the second reflecting surface 32. The dihedral corner reflector 30 is located on a base part 36 formed on the first surface 11*a* shown in FIG. 6. The first reflecting surface 31 and the second reflecting surface 32 each are substantially square when viewed in front-view, and the reflecting surfaces are connected to each other at one side of each of the squares so that the reflecting surfaces are substantially orthogonal to the orientation of the valley.

Hereinbelow, the connecting line between the first and second reflecting surfaces 31 and 32 of the dihedral corner reflector 30 is called a valley-side connecting line 33. The side of the first reflecting surface 31 positioned at the side opposite to the valley-side connecting line 33 and the side of the second reflecting surface 32 positioned at the side opposite to the valley-side connecting line 33 each are called hill-side connecting lines 34.

The first reflecting surface 31 of the dihedral corner reflector 30 is connected at the hill-side connecting line 34 to the second reflecting surface 32 of the dihedral corner reflector 30 adjacent at the negative X2-axis side. The second reflecting surface 32 of the dihedral corner reflector 30 is connected at the hill-side connecting line 34 to the first reflecting surface 31 of another dihedral corner reflector 30 adjacent at the positive X2-axis side. Thus, the multiple dihedral corner reflectors 30 are connected to each other along the X2-direction and are provided continuously.

In the imaging element 10 of the embodiment, the dimensions of the first and second reflecting surfaces 31 and 32 can be, for example, several μm to several hundred μm. For example, the number of integrated dihedral corner reflectors 30 is set according to the size, resolution, and the like of the mid-air image to be displayed. For example, several tens to several thousand dihedral corner reflectors 30 are integrated in one imaging element 10. For example, one thousand dihedral corner reflectors including 100 μm-square reflecting surfaces can be arranged over about 14 cm in the Y2-direction.

As in the enlarged view shown in FIG. 8, the reflector rows 22 of the imaging element 10 are arranged so that the positions in the X2-axial direction of the valley-side connecting line 33 and the hill-side connecting line 34 are respectively the same. This arrangement is not limited thereto; the positions in the X2-axial direction of the valley-side connecting line 33 and the hill-side connecting line 34 may be shifted between the reflector rows 22.

Figure 9A:
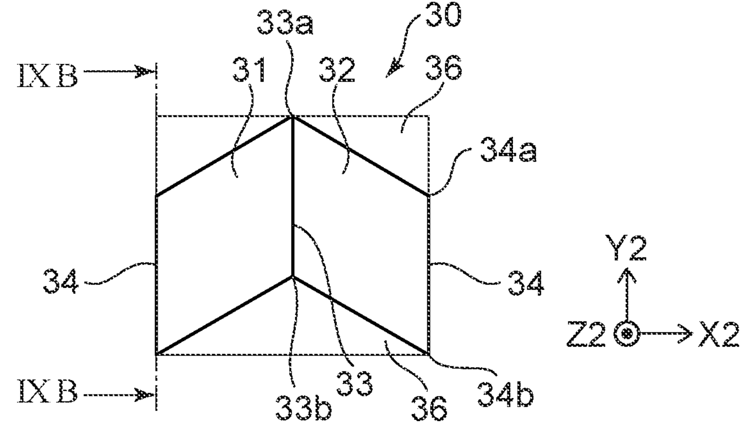
FIG. 9A is a schematic plan view illustrating a portion, i.e., a dihedral corner reflector, of the imaging element of FIG. 8.

FIG. 9A is a schematic plan view illustrating a portion, i.e., the dihedral corner reflector, of the imaging element of FIG. 8.

Figure 9B:
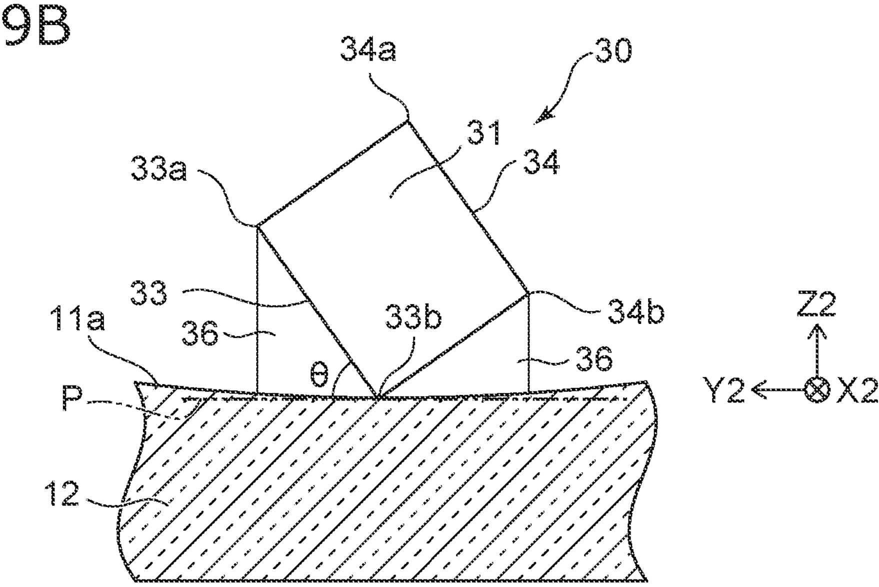
FIG. 9B is an example of a schematic auxiliary cross-sectional view along line IXB-IXB of FIG. 9A.

FIG. 9B is an example of a schematic auxiliary cross-sectional view along line IXB-IXB of FIG. 9A.

As shown in FIGS. 9A and 9B, the dihedral corner reflector 30 includes the first reflecting surface 31 and the second reflecting surface 32, and the first reflecting surface 31 and the second reflecting surface 32 are located on the base part 36. The base part 36 is arranged so that the first reflecting surface 31 and the second reflecting surface 32 have the desired angle with respect to a tangent plane P of the first surface 11*a*.

The base part 36 is formed in a V-shaped configuration, is formed of a light-transmitting member such as, for example, a transparent resin, and is formed as a continuous body with the base member 12. The first reflecting surface 31 and the second reflecting surface 32 are formed by thin film formation of a light-reflective metal material or the like at the formation location of the V-shaped of the base member 12. The formation is not limited to such an example; each or a portion of the first reflecting surface 31, the second reflecting surface 32, the base part 36, and the base member 12 may be formed separately, and assembled as one to form the imaging element 10. For example, mirror finishing or the like of the surface of the transparent resin is performed, and the first reflecting surface 31 and the second reflecting surface 32 can be used as-is as the surface of the transparent resin when the surface reflectance of the transparent resin is sufficiently high. It is favorable for the spacing 23 and/or the base part 36 to be light-transmissive or light-absorbing to prevent false image observation, etc.

The dihedral corner reflector 30 may be formed as follows. The first reflecting surface 31 and the second reflecting surface 32 are formed in the surface of the transparent resin. The first reflecting surface 31 and the second reflecting surface 32 that are formed are exposed in air and arranged so that light incident from the surface opposite to the surface at which the first reflecting surface 31 and the second reflecting surface 32 are formed. As a result, the first reflecting surface 31 and the second reflecting surface 32 can function as total reflection surfaces due to the refractive index difference between the transparent resin and the air.

The first reflecting surface 31 and the second reflecting surface 32 are connected at the valley-side connecting line 33 to be substantially orthogonal. The hill-side connecting line 34 of the first reflecting surface 31 is positioned at the side opposite to the valley-side connecting line 33, and the hill-side connecting line 34 of the second reflecting surface 32 is positioned at the side opposite to the valley-side connecting line 33.

The end portions of the valley-side connecting line 33 are called vertices 33*a* and 33*b*. The position of the vertex 33*a* is further toward the positive Z2-axis side than the position of the vertex 33*b*. That is, the vertex 33*a* is positioned to be more distal to the base member 12 than the vertex 33*b*. The end portions of the hill-side connecting line 34 are called vertices 34*a* and 34*b*. The position of the vertex 34*a* is further toward the positive Z2-axis side than the position of the vertex 34*b*. That is, the vertex 34*a* is positioned to be more distal to the base member 12 than the vertex 34*b*. Accordingly, the vertex 34*a* is positioned to be furthest from the base member 12, and the vertex 33*b* is positioned to be most proximate to the base member 12.

FIG. 9B shows the relationship between the dihedral corner reflector 30, the first surface 11*a*, and the tangent plane P. The dihedral corner reflector 30 contacts the first surface 11*a* at the vertex 33*b* at the lower side of the valley-side connecting line 33. The tangent plane P contacts the first surface 11*a* at the position of the vertex 33*b*. The dihedral corner reflector 30 is located on the first surface 11*a* so that the valley-side connecting line 33 forms an angle θ with the tangent plane P.

Figure 9C:
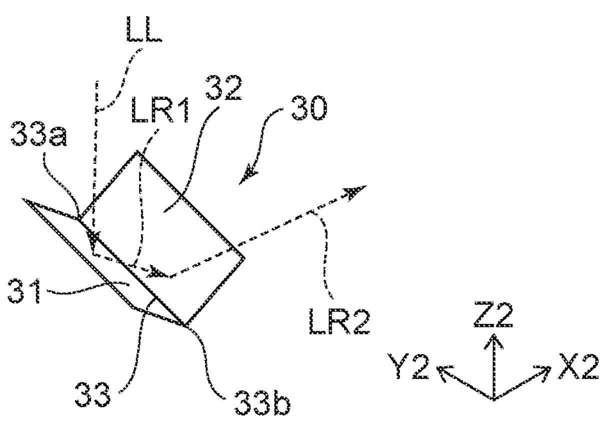
FIG. 9C is a schematic perspective view for describing an operation of the dihedral corner reflector of FIG. 9A.
Figure 9D:
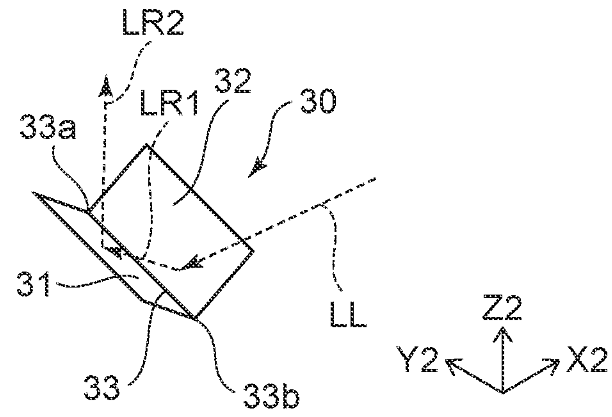
FIG. 9D is a schematic perspective view for describing an operation of the dihedral corner reflector of FIG. 9A.

FIGS. 9C and 9D are schematic perspective views for describing the operation of the dihedral corner reflector of FIG. 9A.

As shown in FIG. 9C, when a light ray LL is incident on the first reflecting surface 31, the light ray LL is reflected by the first reflecting surface 31. A once-reflected light LR1 that is reflected by the first reflecting surface 31 is re-reflected by the second reflecting surface 32. A twice-reflected light LR2 that is reflected by the second reflecting surface 32 is emitted toward the same side as the light source of the incident light. Thus, the dihedral corner reflector 30 emits the incident light from the first surface 11*a* side toward a different position from the light source at the first surface 11*a* side. Thus, the dihedral corner reflector 30 reflects the light twice by two reflecting surfaces, and reflects the twice-reflected light LR2 toward the side from which the incident light ray LL traveled.

The reflection operation of the dihedral corner reflector 30 is reversible. When the light ray that is incident on the dihedral corner reflector 30 is incident along the opposite direction along the twice-reflected light LR2 in FIG. 9C, the light ray is reflected in the opposite direction along the incident light ray LL. Specifically, as shown in FIG. 9D, the light ray LL that is incident on the dihedral corner reflector 30 is reflected by the second reflecting surface 32 and incident on the first reflecting surface 31 as the once-reflected light LR1. The once-reflected light LR1 is reflected by the first reflecting surface 31 and emitted as the twice-reflected light LR2.

As shown in FIGS. 8 and 9A, the dihedral corner reflector 30 is line-symmetric with respect to the valley-side connecting line 33, and is positioned so that the angle of the first reflecting surface 31 with respect to the tangent plane P is substantially equal to the angle of the second reflecting surface 32 with respect to the tangent plane P. Therefore, when the light ray is initially incident on the first reflecting surface 31, the dihedral corner reflector 30 emits the reflected light by an operation similar to when the light ray is initially incident on the second reflecting surface 32. For example, in FIG. 9C, the light ray LL is initially incident on the first reflecting surface 31 and reflected by the first reflecting surface 31; however, the operation of the dihedral corner reflector 30 can be similar to the description described above even when the light ray LL is initially incident on the second reflecting surface 32 and reflected by the second reflecting surface 32. In FIG. 9D, the light ray LL may be initially incident on the first reflecting surface 31, and the once-reflected light from the first reflecting surface 31 may be reflected by the second reflecting surface 32 and emitted as the second reflected light. Unless otherwise noted in the description of the operation of the imaging element hereinbelow, the case where the light ray LL is initially reflected by the first reflecting surface 31 will be described.

Figure 10:
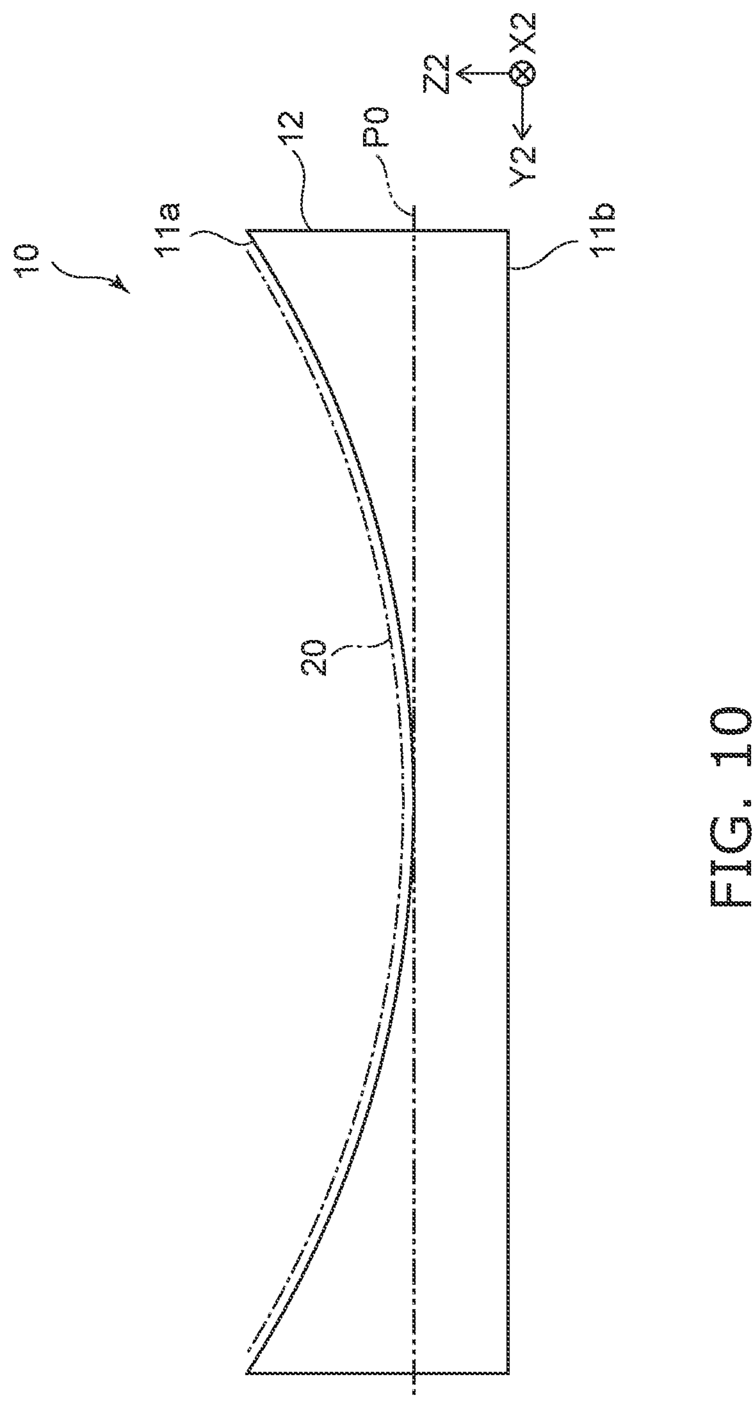
FIG. 10 is a schematic side view illustrating the imaging element of FIG. 6.

FIG. 10 is a schematic side view illustrating the imaging element of FIG. 6. In FIG. 10, the reflector array 20 is shown by an envelope connecting the vertices 33*a* of the dihedral corner reflectors 30 shown in FIGS. 9A and 9B. In side views illustrating the imaging element hereinbelow, the reflector array 20 is illustrated by illustrating the envelope of the vertices 33*a* of the dihedral corner reflectors 30 as a single dot-dash line as shown in FIG. 10 unless it is necessary to show and describe the configuration of the dihedral corner reflector 30.

In the imaging element 10 as shown in FIG. 10, the reflector array 20 is provided in a curved shape because the first surface 11*a* is a curved surface. The first surface 11*a* includes a portion of a circular arc that is convex toward the negative Z2-axis side when the Y2Z2-plane is viewed in plan. The reflector array 20 also is provided in an arc-like shape. The envelope of the vertices also is a circular arc. The radius of the circular arc is set based on the distance between the imaging element 10 and the light source provided at the first surface 11*a* side of the imaging element 10. For example, the radius of the circular arc of the reflector array 20 is set to about 2 times the distance between the imaging element 10 and the light source.

As described with reference to FIGS. 9C and 9D, the imaging element 10 is reversible with respect to the incidence and reflection directions of the light ray. When the incidence and reflection directions of the imaging element 10 are reversed, the radius of the circular arc is set based on the distance between the imaging element 10 and the floating image formed at the first surface 11*a* side. Similarly to the description described above, the radius of the circular arc of the reflector array 20 is set to about 2 times the distance between the imaging element 10 and the floating image.

In the imaging element 10, the tangent plane that contacts the first surface 11*a* at the lowest position in the negative Z2-axis side direction is the virtual plane P0 that is parallel to the XY-plane.

Figure 11:
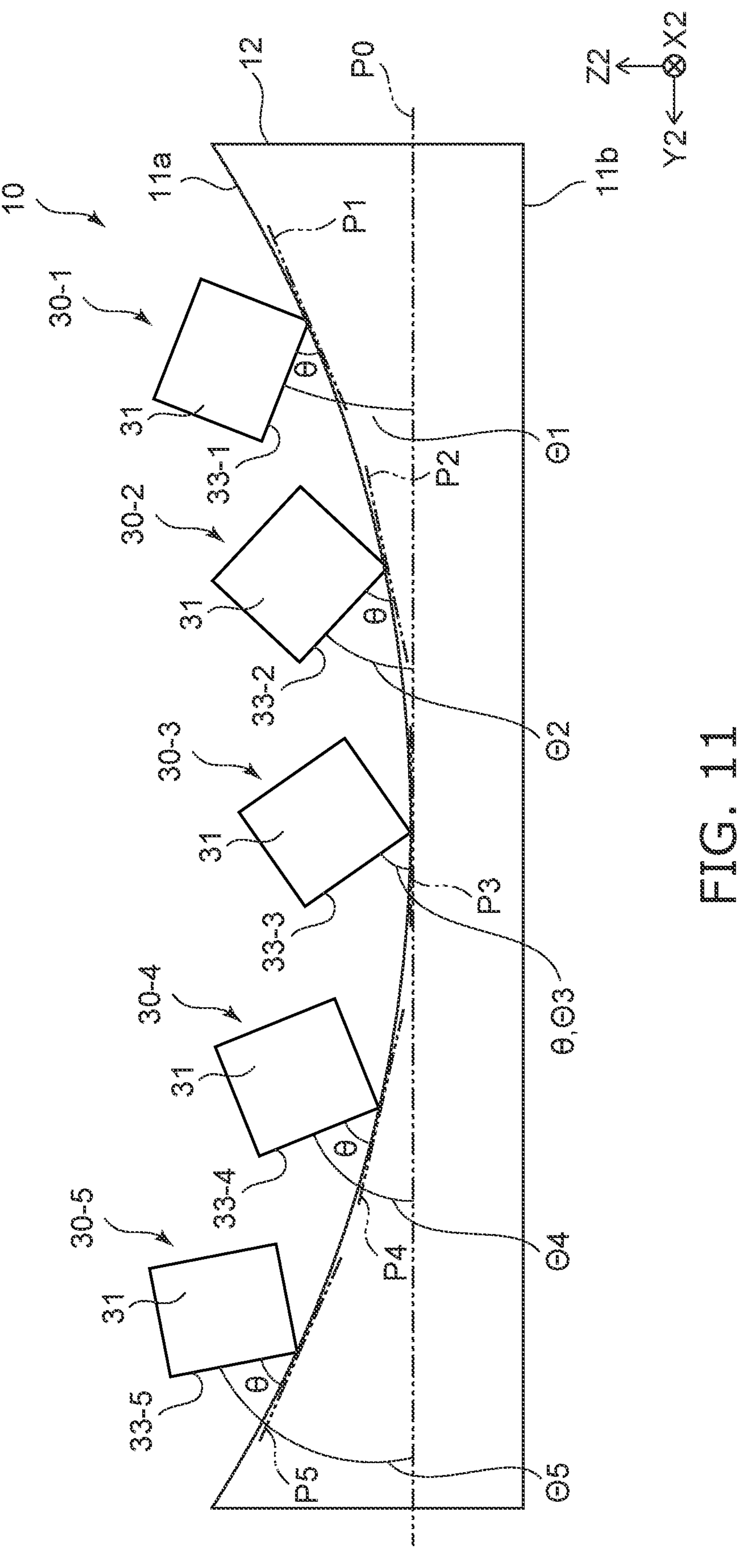
FIG. 11 is a schematic side view illustrating the imaging element of FIG. 6.

FIG. 11 is a schematic side view illustrating the imaging element of FIG. 6.

FIG. 11 shows one dihedral corner reflector included in the reflector rows 22 shown in FIGS. 6 and 8. As described with reference to FIGS. 6 and 8, the multiple reflector rows 22 each extend along the X2-direction and are arranged at substantially uniform spacing in the Y2-direction. The angles of the multiple dihedral corner reflectors included in one reflector row 22 with respect to the virtual plane P0 are substantially the same. Accordingly, the angle of the dihedral corner reflector 30 with respect to the virtual plane P0 refers to the angle with respect to the virtual plane P0 of the reflector row 22 to which the dihedral corner reflector 30 belongs.

FIG. 11 is an enlarged schematic illustration of five dihedral corner reflectors 30-1 to 30-5 among the many dihedral corner reflectors arranged in the Y2-direction. Although different reference numerals are used to differentiate the positions in the Y2-axis, the configurations of the dihedral corner reflectors 30-1 to 30-5 are the same as that of the dihedral corner reflector 30 described with reference to FIGS. 9A and 9B. The base part 36 shown in FIG. 9B is not illustrated to avoid complexity in the illustration.

As shown in FIG. 11, the dihedral corner reflectors 30-1 to 30-5 have different angles Θ1 to Θ5 with respect to the virtual plane P0 according to the positions in the Y2-axis along the first surface 11*a*. The angles Θ1 to Θ5 of the dihedral corner reflectors 30-1 to 30-5 are illustrated by the angles of the valley-side connecting lines (straight lines) 33-1 to 33-5 with respect to the virtual plane P0.

In the example shown in FIG. 11, the dihedral corner reflectors 30-1 to 30-5 are arranged in this order in the positive direction of the Y2-axis. The angles Θ1 to Θ5 of the dihedral corner reflectors 30-1 to 30-5 are set to increase in this order. That is, the sizes of the angles Θ1 to Θ5 are set to Θ1<Θ2<Θ3<Θ4<Θ5.

More generally, when referenced to the reflector row (a first reflector row) 22 of the dihedral corner reflector set to the smallest value, the angles Θ1 to Θ5 of the dihedral corner reflectors 30-1 to 30-5 increase away from the reflector row 22 in one direction along the Y2-axis. Also, the angles Θ1 to Θ5 decrease away from the reference reflector row 22 in the other direction along the Y2-axis. In the example of FIG. 11, when the position of the dihedral corner reflector 30-1 set to the smallest angle is used as the reference, the sizes of the angles Θ1 to Θ5 are Θ1<Θ2<Θ3<Θ4<Θ5 in the positive direction of the Y2-axis.

The angles Θ1 to Θ5 of the dihedral corner reflector can be set so that 0°<Θ1 to the Θ5<90°. Although the angles between the first reflecting surface 31 and the virtual plane P0 are determined according to the angles Θ1 to Θ5, 45°<(the angle between the first reflecting surface 31 and the virtual plane P0)<90° can be set. The angle between the second reflecting surface 32 and the virtual plane P0 is equal to the angle between the first reflecting surface 31 and the virtual plane P0. Accordingly, 45°<(the angle between the second reflecting surface 32 and the virtual plane P0)<90° can be set.

The tilts of the dihedral corner reflectors 30-1 to 30-5 also may be set using the angles with respect to tangent planes P1 to P5 of the first surface 11*a* at which the dihedral corner reflectors 30-1 to 30-5 are located. The angles of the dihedral corner reflectors 30-1 to 30-5 with respect to the tangent planes P1 to P5 are set to a constant angle θ regardless of the positions of the dihedral corner reflectors 30-1 to 30-5 in the Y2-axis. For example, the angle θ is based on the angle between the horizontal plane and each reflecting surface of a corner cube reflector and is set to about 30°, and more specifically, 35.3°.

In the imaging element 10 of the example, when referenced to the base member 12, the angles Θ1 to Θ5 of the dihedral corner reflectors 30-1 to 30-5 are appropriately set so that the light rays incident from the light source provided at the first surface 11*a* side are imaged at the first surface 11*a* side. The imaging position is at a different mid-air position from the light source. The angles of the dihedral corner reflectors with respect to the virtual plane P0 are determined by, for example, experiments, simulations, etc.

The angles of the dihedral corner reflectors with respect to the virtual plane P0 are set to increase according to the position in the Y2-axis, or are set to decrease according to the position in the Y2-axis; therefore, the first surface 11*a* may not be a portion of a circular arc of a perfect circle. For example, the first surface 11*a* may be a portion of an arc of an ellipse, or may be a portion of a polygon corresponding to the number of reflector rows. It is sufficient to be able to set the angles of the dihedral corner reflectors according to the positions of the dihedral corner reflectors in the Y2-axis; therefore, the angles of the dihedral corner reflectors may be referenced to another plane having any angle with respect to the virtual plane P0 without using the virtual plane P0 as a reference.

Modifications of the imaging element will now be described.

Figure 12A:
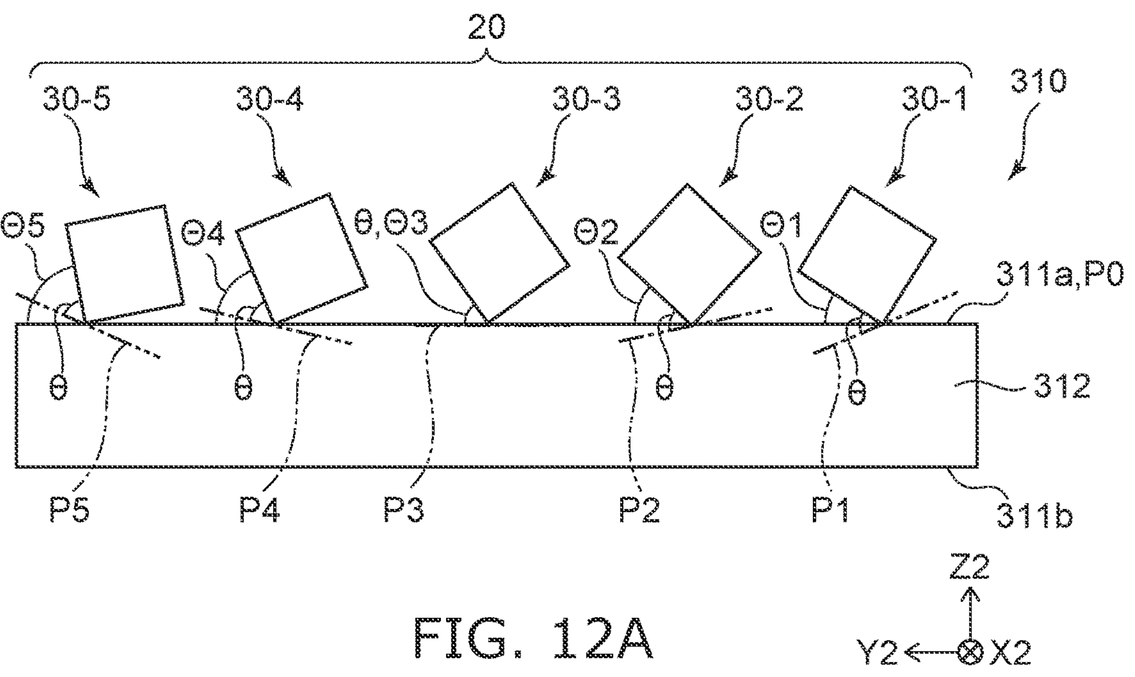
FIG. 12A is a schematic side view illustrating a portion, i.e., a modification of the imaging element, of the image display device according to the first embodiment.

FIG. 12A is a schematic side view illustrating a portion, i.e., a modification of the imaging element, of the image display device according to the first embodiment.

Figure 12B:
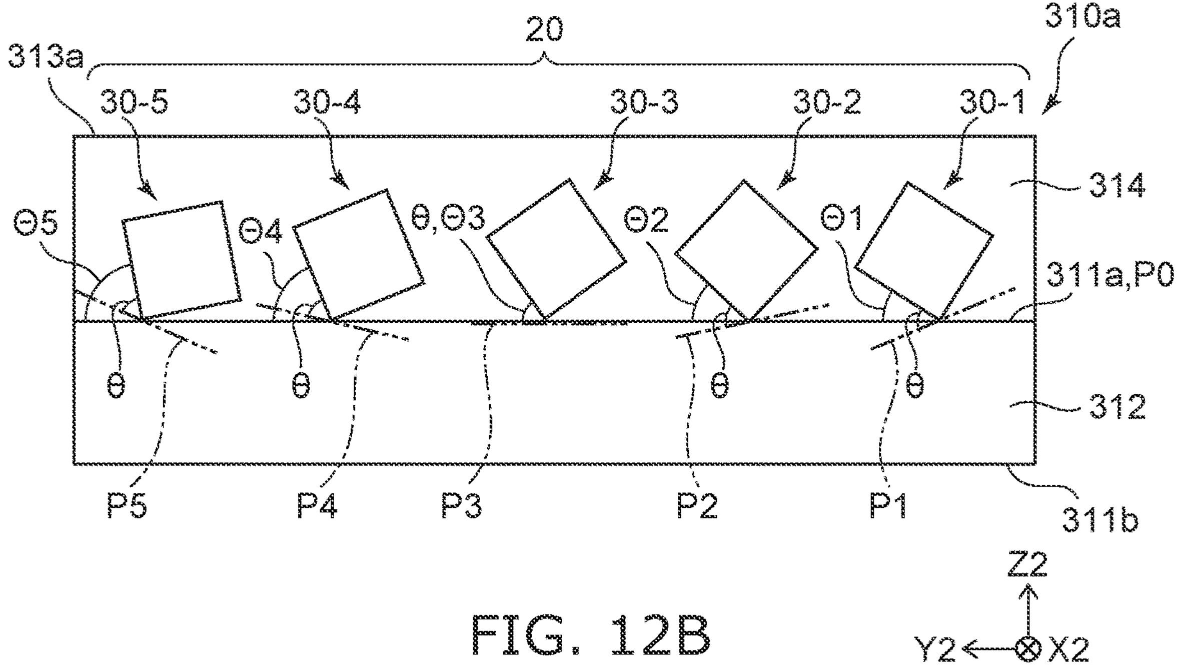
FIG. 12B is a schematic side view illustrating a portion, i.e., another modification of the imaging element, of the image display device according to the first embodiment.

FIG. 12B is a schematic side view illustrating a portion, i.e., another modification of the imaging element, of the image display device according to the first embodiment.

As long as the angles of the dihedral corner reflectors with respect to the virtual plane P0 can be set similarly to the imaging element 10 shown in FIG. 6, the reflector array 20 need not be formed on a curved surface, and may be provided on one plane.

Similarly to the description with reference to FIG. 11, FIGS. 12A and 12B are enlarged schematic illustrations of the five dihedral corner reflectors 30-1 to 30-5. The five dihedral corner reflectors 30-1 to 30-5 and their tilts corresponding to their positions are shown.

As shown in FIG. 12A, an imaging element 310 of the modification includes the reflector array 20 and a base member 312. The base member 312 includes the first surface 311*a* and a second surface 311*b*. The second surface 311*b* is positioned at the side opposite to the first surface 311*a*. The first surface 311*a* is a plane substantially parallel to the X2Y2-plane. The first surface 311*a* may be the virtual plane P0. Similarly to the example shown in FIG. 11, for example, the base member 312 is formed of a light-transmitting material.

The angles of the dihedral corner reflectors 30-1 to 30-5 with respect to the virtual plane P0 are respectively Θ1 to Θ5, and the sizes of the angles Θ1 to Θ5 are Θ1<Θ2<Θ3<Θ4<Θ5. The positions of the dihedral corner reflectors 30-1 to 30-5 in the Y2-axis are the same as the positions of the dihedral corner reflectors 30-1 to 30-5 in the Y2-axis shown in FIG. 11. Accordingly, for the tangent planes P1 to P5 of the circular arc corresponding to the positions in the Y2-axis of FIG. 11, the angles between the dihedral corner reflectors 30-1 to 30-5 and the tangent planes P1 to P5 all have the same value of the angle θ.

As shown in FIG. 12B, the imaging element 310*a* of the modification includes the reflector array 20 and the base member 312, and further includes a protective layer 314. The configurations of the reflector array 20 and the base member 312 are the same as those of the imaging element 310 described with reference to FIG. 12A. The protective layer 314 is provided to cover the reflector array 20 and the first surface 311*a*.

When the light rays are incident on the imaging element 310*a* via the protective layer 314, the protective layer 314 includes a material having high light transmissivity so that the transmitted amount of the light rays is substantially constant. It is favorable for a surface 313*a* of the protective layer 314 to be sufficiently flat so that the refraction angles of the incident light rays are substantially constant.

According to the modification, the base member 312 can be a flat plate, and so the thickness of the base member necessary to make the first surface and/or the second surface into a curved surface can be reduced; therefore, the imaging elements 310 and 310*a* can be thinned. The imaging element 310 shown in FIG. 12A is a member in which the reflector array 20 is formed at the first surface 311*a* of the base member 312, and the second surface 311*b* has a flat surface. Therefore, production by a press using a resin base member is favorable. Also, the production of the imaging element 310 is advantageous in that production by a roll-to-roll method is easy. The roll-to-roll method is a production technique in which a base member that is wound in a roll shape is continuously supplied to the process for patterning, processing, etc. The roll-to-roll method is widely utilized in the production of plate-shaped or film-like plastic molded products, etc.

The image display device 1000 according to the embodiment includes the imaging element 310*a* shown in FIG. 12B. The configuration is not limited thereto; the image display device may include any of the imaging elements 10 and 310 described above. The components of the imaging elements 10, 310, and 310*a* can be combined as appropriate. For example, the protective layer 314 may be provided at the first surface 11*a* side of the imaging element 10.

The operation of the imaging element, including the operation principle, will now be described. Unless otherwise noted hereinbelow, the imaging element 10 described with reference to FIGS. 6 to 11 will be described. The operations of the imaging elements 310 and 310*a* of the modifications can be understood similarly to the imaging element 10.

Figure 13:
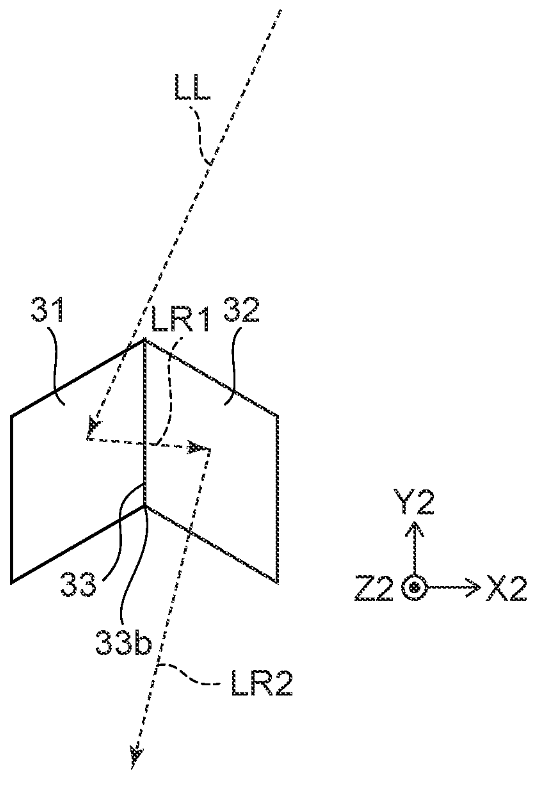
FIG. 13 is a schematic plan view for describing a portion, i.e., an operation of the imaging element, of the image display device according to the first embodiment.

FIG. 13 is a schematic plan view for describing a portion, i.e., an operation of the imaging element, of the image display device according to the first embodiment. As shown in FIG. 13, the first reflecting surface 31 and the second reflecting surface 32 are provided to be substantially orthogonal and connected at the valley-side connecting line 33. The vertex 33*b* is provided to have a minimum value in the Z2-axis direction.

The light ray LL that is incident on the first reflecting surface 31 is reflected by the first reflecting surface 31. The once-reflected light LR1 that is reflected by the first reflecting surface 31 is reflected by the second reflecting surface 32. Unlike a corner cube reflector (e.g., Patent Literature 2), the dihedral corner reflector 30 does not include a third reflecting surface; therefore, the twice-reflected light LR2 that is reflected by the second reflecting surface 32 travels straight as-is. Here, the valley-side connecting line 33 is provided at a prescribed angle with respect to the X2Y2-plane; therefore, the twice-reflected light LR2 that is emitted from the dihedral corner reflector 30 is emitted toward the same side as the side at which the light ray LL is incident.

Figure 14:
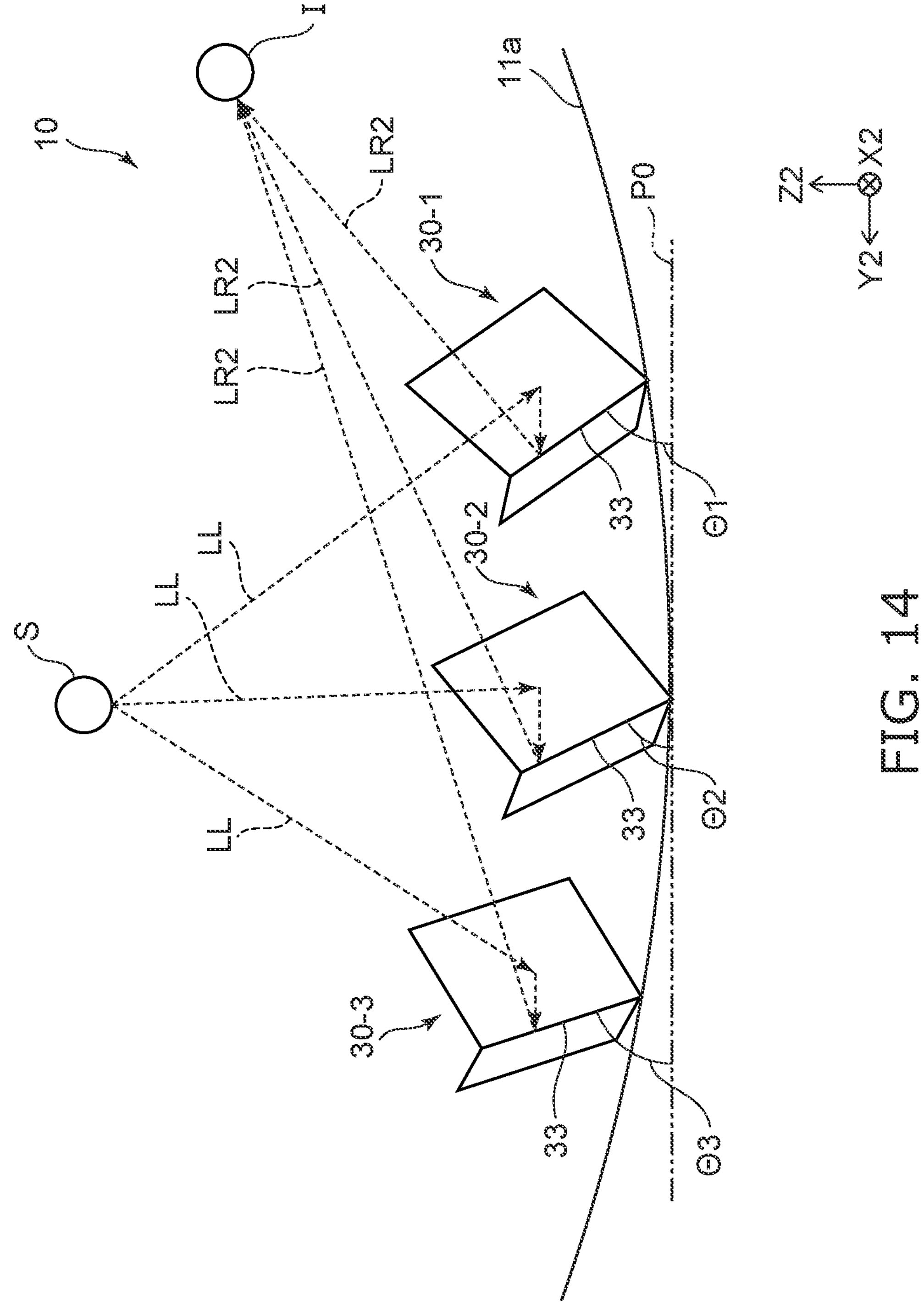
FIG. 14 is a schematic side view for describing a portion, i.e., an operation of the imaging element, of the image display device according to the first embodiment.
Figure 15:
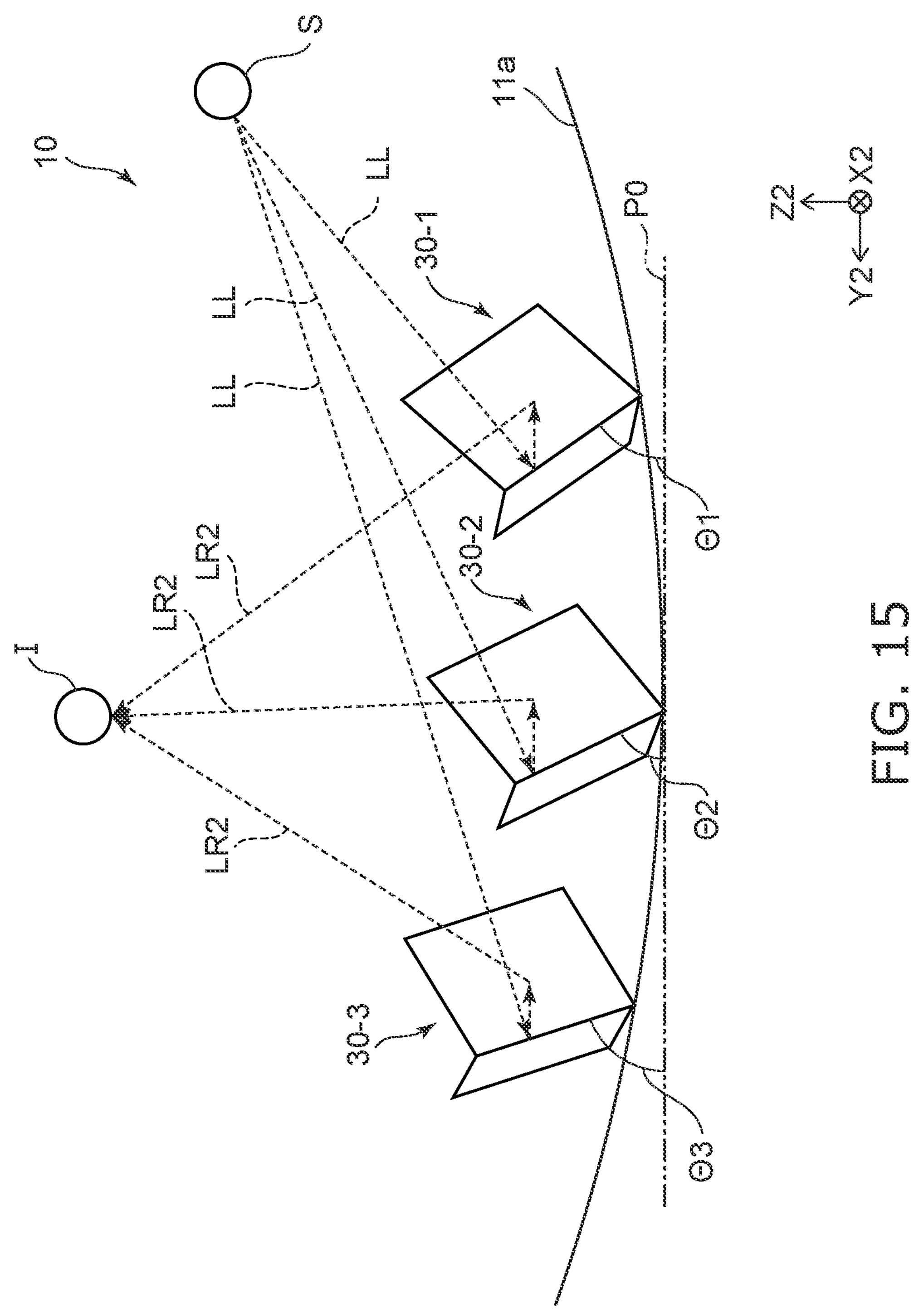
FIG. 15 is a schematic side view for describing a portion, i.e., an operation of the imaging element, of the image display device according to the first embodiment.

FIGS. 14 and 15 are schematic side views for describing a portion, i.e., an operation of the imaging element, of the image display device according to the first embodiment.

In the example of FIG. 14, a light source S is located in the normal direction of the virtual plane P0 at the first surface 11*a* side. In the imaging elements 310 and 310*a* of the modifications shown in FIGS. 12A and 12B, the light source is located in the normal direction of the first surface 311*a* at the first surface 311*a* side.

In the imaging element 10 as shown in FIG. 14, the first surface 11*a* is set to be a portion of a circular arc that is convex toward the negative Z2-axis side when projected onto the YZ-plane. The dihedral corner reflectors 30-1 to 30-3 are located on the first surface 11*a*. In the example shown in FIG. 14, the angles Θ1 to Θ3 that indicate the tilts of the dihedral corner reflectors 30-1 to 30-3 with respect to the virtual plane P0 are set to increase in the positive direction of the Y2-axis. Thus, by setting the angles Θ1 to Θ3, the twice-reflected light LR2 that is reflected twice by the dihedral corner reflector 30 forms a floating image I at the first surface 11*a* side at which the light source S is provided.

The imaging element 10 operates even when the position of the light source S and the position of the floating image I are interchanged.

In FIG. 15, the configurations of the dihedral corner reflectors 30-1 to 30-3 and the relationship of the dihedral corner reflectors 30-1 to 30-3, the first surface 11*a*, and the virtual plane P0 are the same as those described with reference to FIG. 14.

As shown in FIG. 15, the light source S is located at the position of the floating image I described with reference to FIG. 14; in such a case, the floating image I is formed at the position of the light source S in FIG. 14. The light rays LL that are emitted from the light source S each are reflected twice by the dihedral corner reflectors 30-1 to 30-3, and the twice-reflected light LR2 forms a floating image at the position of the floating image I. That is, in the example shown in FIG. 15, the floating image I is formed in the normal direction of the virtual plane P0 at the first surface 11*a* side. In the case of the imaging elements 310 and 310*a* according to the modification shown in FIGS. 12A and 12B, the floating image is formed in the normal direction of the first surface 311*a* at the first surface 311*a* side.

When the light source S is at either position, the angles of the dihedral corner reflectors can be appropriately set by using experiments, simulations, etc., to form the floating image at the desired position by reflecting the light ray incident on the dihedral corner reflector twice. For example, according to the embodiment shown in FIG. 14, the light source S is set to be substantially directly above the reflector array, and according to the embodiment shown in FIG. 15, the position at which the floating image I is formed is set to be substantially directly above the reflector array. It is also possible to appropriately modify the positions of the light source S and the floating image I by appropriately adjusting the angles of the dihedral corner reflectors with respect to the virtual plane P0. When making such a design modification, ray analysis tools such as ray tracing simulation, etc., can be effectively utilized.

In the image display device 1000 according to the embodiment, the floating image is formed directly above the reflector array. In such a case as well, it is possible to interchange the position of the display device 1100(S), which is the light source, and the position at which the floating image I is formed. For the image display device 1000 of FIG. 1, it goes without saying that if the position of the display device 1100(S) and the position at which the floating image is formed are interchanged, it is necessary to modify the configurations of the housing and the light-transmitting member according to the optical path after interchanging.

An operation of the image display device 1000 according to the embodiment will now be described.

Figure 16:
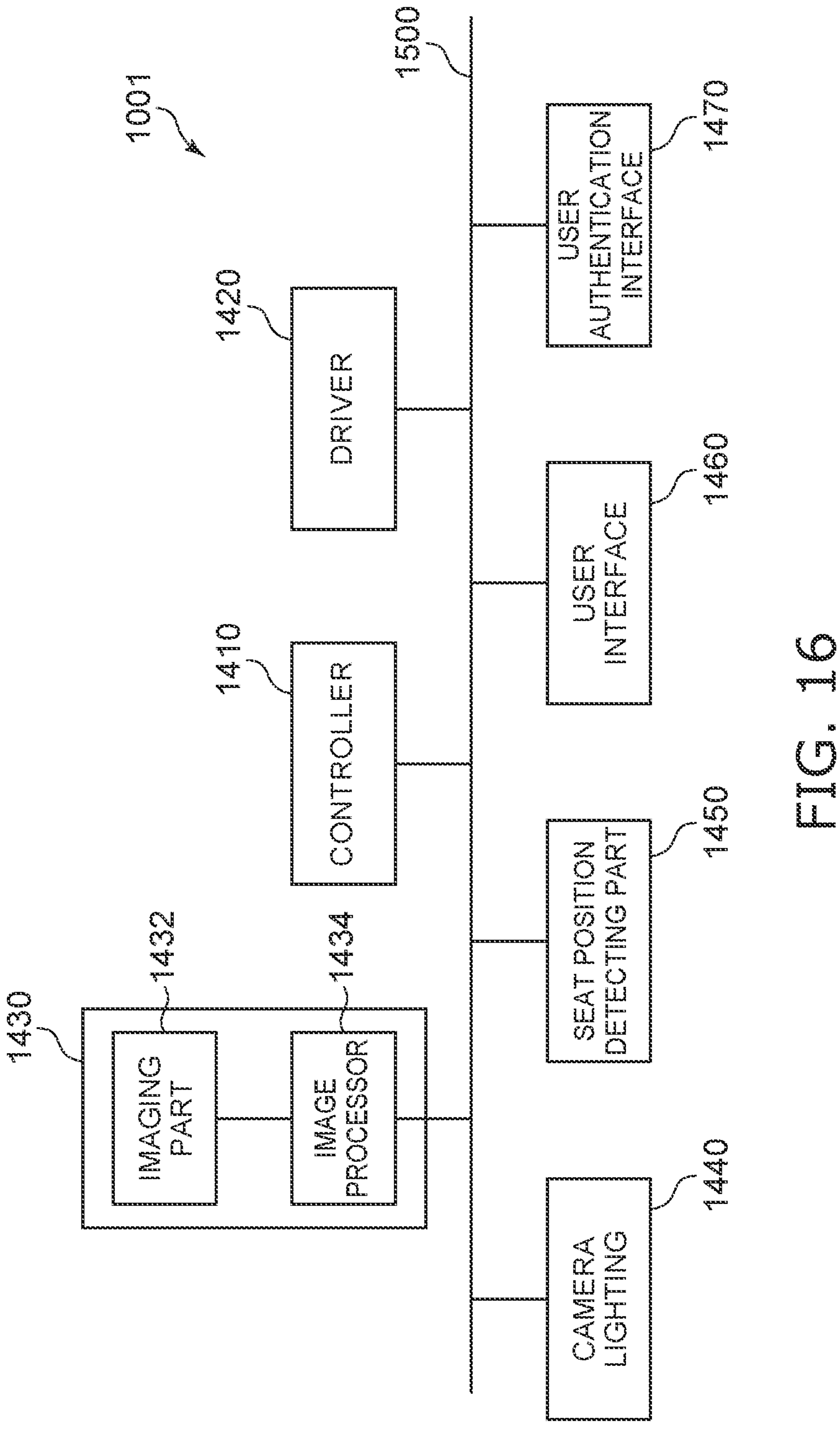
FIG. 16 is an example of a schematic block diagram illustrating a control system of the image display device according to the first embodiment.

FIG. 16 is an example of a schematic block diagram illustrating a control system of the image display device according to the first embodiment.

As shown in FIG. 16, the control system 1001 of the image display device 1000 includes the position detecting part 1430, the controller 1410, and the driver 1420. The position detecting part 1430 includes the imaging part 1432 and an image processor 1434. The imaging part 1432 is, for example, at least one camera imaging the observer O1. The imaging part 1432 acquires image data (first image data) including information related to the pupil position of the observer O1. The image processor 1434 detects the pupil position of the observer O1 by performing image processing of the image data.

The position detecting part 1430, the controller 1410, and the driver 1420 are communicatably connected via a communication network 1500. For example, the image display device 1000 is mounted to a transportation vehicle such as a private automobile or the like, and the observer O1 shown in FIG. 1 is, for example, the driver of the vehicle in which the image display device 1000 is mounted. The communication network 1500 is, for example, an automotive ethernet, etc.

In the example, the camera lighting 1440, a seat position detecting part 1450, a user interface 1460, and a user authentication interface 1470 are communicatably connected to the communication network 1500.

The seat position detecting part 1450 detects the position of the seat on which the observer O1 is seated and transmits the detected value to the image processor 1434. For example, the seat on which the observer O1 is seated is a sliding seat that slides frontward and backward.

There are cases where information related to the distance between the observer O1 and the image display device 1000 is not directly included in the image of the observer O1 imaged by the imaging part 1432. To calculate the pupil position of the observer O1, information of the distance between the position of the observer O1 and the position of the image display device 1000 is necessary. When the position at which the observer O1 stands or sits is fixed, the fixed value is preset as the distance between the position of the observer O1 and the position of the image display device 1000. When the position fluctuates as in a seat inside a vehicle, the image processor 1434 detects the pupil position of the observer O1 by detecting the position of the seat with the seat position detecting part 1450 and then calculating the position of the observer O1 as in the example.

The user interface 1460 is a switch, a lever, or the like for the observer and/or passenger to operate the image display device. The user interface 1460 is not limited to a mechanical switch or the like, and may be a touch panel-type, or may be realized by voice recognition and/or a mid-air image. The observer O1 operates the switch, etc., to transmit a signal corresponding to the operation to the controller 1410. For example, the observer O1 may operate a switch to switch between displaying and not displaying the mid-air image, and the observer O1 may operate a lever to modify the display position of the mid-air image.

The user authentication interface 1470 is an interface for determining whether or not the observer O1 is a preregistered user. The user authentication interface 1470 uses image data (second image data) acquired by the imaging part 1432 to determine whether or not the user of the image display device 1000 is a preregistered user.

Figure 17:
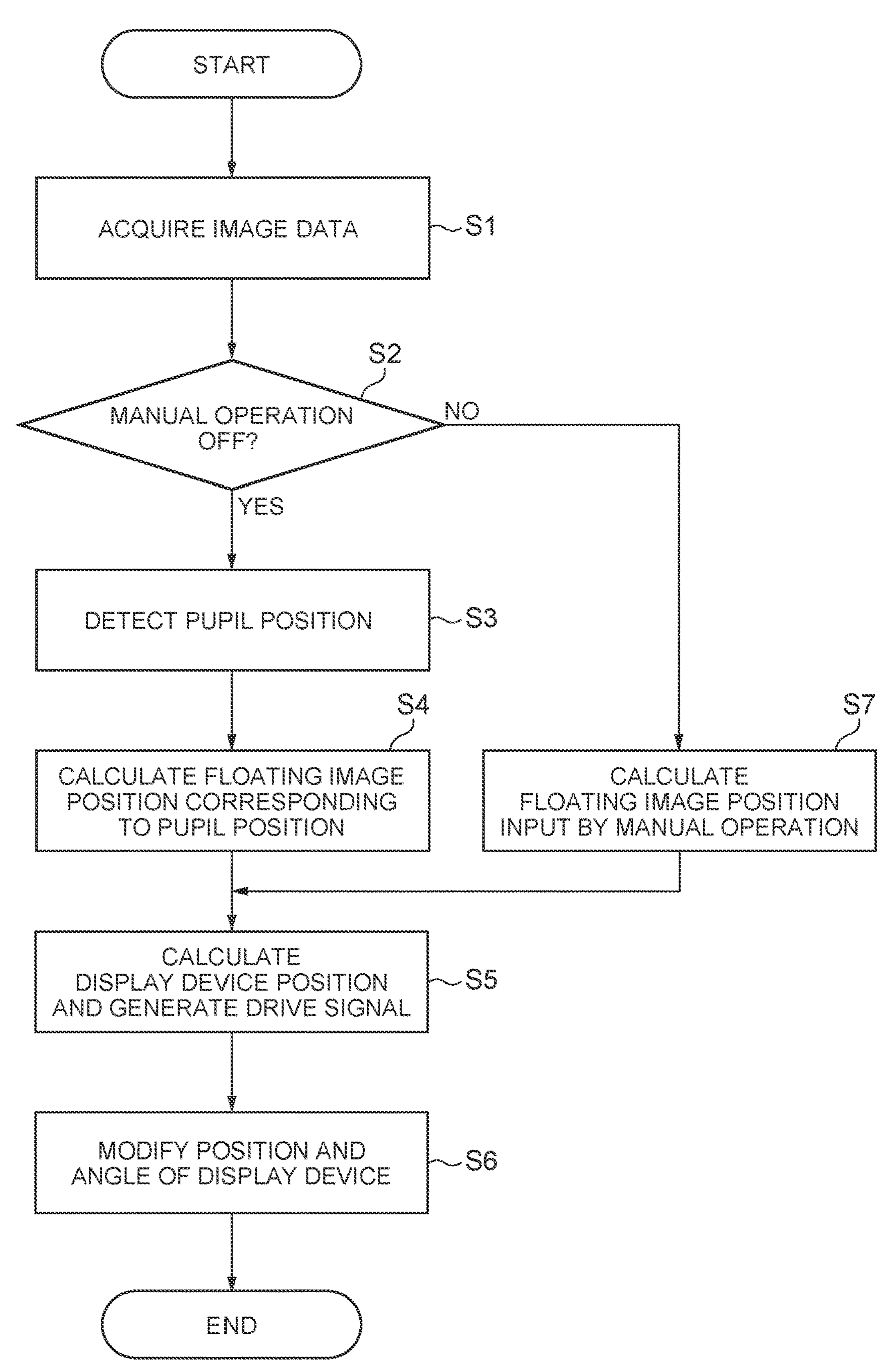
FIG. 17 is an example of a flowchart for describing an operation of the image display device according to the first embodiment.

FIG. 17 is an example of a flowchart for describing an operation of the image display device according to the first embodiment.

The flowchart of FIG. 17 illustrates a series of procedures in which the image display device 1000 calculates the pupil position of the observer O1 and forms the floating image I1 in mid-air.

In step S1 as shown in FIG. 17, the imaging part 1432 images an image including the pupil position of the observer O1 and acquires image data of a prescribed format.

In step S2, the controller 1410 monitors the presence or absence of an interruption from the user interface 1460. When there is no interruption from the user interface 1460, the controller 1410 determines that there was no manual operation by the observer O1, and causes the processing to transition to step S3.

In step S3, the image processor 1434 performs image analysis of the image data and detects the pupil position of the observer O1 by also using the information of the seat position detected by the seat position detecting part 1450.

In step S4, the controller 1410 calculates the formation position of the floating image I1 based on the detected position of the pupil.

In step S5, the controller 1410 calculates the position of the display device 1100(S) and the angle of the light emitted by the display device 1100(S) based on the position at which the floating image I1 is formed, generates a drive signal corresponding to the calculated position and angle, and transmits the results to the driver 1420.

In step S6, the driver 1420 modifies the position and angle of the display device 1100(S) according to the drive signal transmitted from the controller 1410.

When there is an interruption from the user interface 1460 in step S2, the controller 1410 determines that there was a manual operation by the observer O1, and causes the processing to transition to step S7. In step S7, the controller 1410 calculates the position of the floating image I1 input by the manual operation, and causes the processing to transition to step S5. The processing of step S5 and subsequent steps proceeds similarly to those described above.

The series of processing of steps S1 to S7 is repeatedly performed at, for example, a constant cycle length by using the processing of steps S1 to S7 as one cycle. Even when the image display device 1000 is mounted in a vehicle and the vehicle vibrates, the formation position of the floating image I1 can be appropriately adjusted at each cycle length.

The control system 1001 may be connected to another interface via the communication network 1500. For example, the other interface may generate a start signal corresponding to the start of the engine of the vehicle and generate a stop signal corresponding to the vehicle stopping, and the controller 1410 may set the position of the floating image I1 according to these signals. By using such an interface, the modification operation of the formation position of the floating image I1 can be performed when the vehicle is stopped, shaking when the position detecting part 1430 images can be suppressed, and the detection accuracy of the pupil position of the observer O1 can be increased.

The steps of the flowchart described above are examples, and the operation of the image display device 1000 is not limited thereto. For example, the determination of step S2 may be performed before acquiring the image data of step S1, or may be after the pupil position is detected in step S3.

Thus, the image display device 1000 according to the embodiment can modify the position at which the floating image I1 is formed according to the position of the observer O1, and can form the floating image I1 at a position that is easy to view by the observer O1.

In the specific example above, the control system 1001 of the image display device 1000 uses the pupil position of the observer O1 to calculate the position of the floating image I1 viewed by the observer O1. More simply, the position at which the floating image I1 is formed may be calculated by using the position of the eye inside the face of the observer O1 inside the image data of the observer O1 to estimate the direction in which the observer O1 faces. More simply, the formation position of the floating image I1 also can be adjusted by the imaging part 1432 imaging the entire observer O1, and by calculating the position at which the observer O1 stands or sits. More simply, multiple switches may be pre-arranged as position detecting parts at the position at which the observer O1 stands, and the formation position of the floating image I1 may be set by determining which switch is on to determine the position at which the observer O1 stands. In such a case, the imaging part may be unnecessary because the formation position of the floating image I1 is predetermined.

Figure 18:
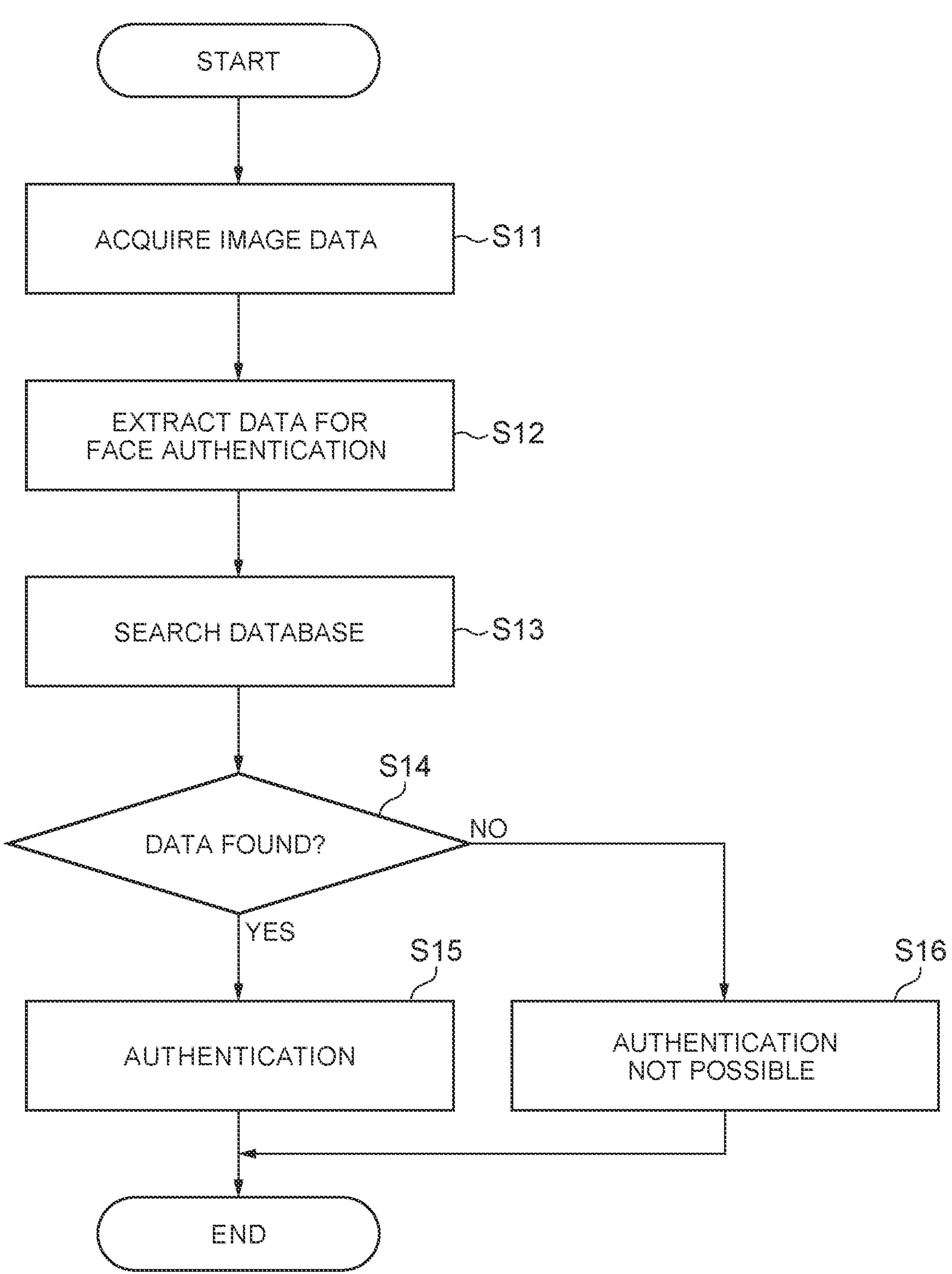
FIG. 18 is an example of a flowchart for describing an operation of the image display device according to the first embodiment.

FIG. 18 is an example of a flowchart for describing an operation of the image display device according to the first embodiment.

FIG. 18 shows a procedure for user authentication by the user authentication interface 1470 shown in FIG. 16. For example, the user authentication provided by the user authentication interface 1470 performs the face authentication of a user of a vehicle by using user image data of the image display device 1000 acquired by the imaging part 1432 of the image display device 1000 mounted in the vehicle. The user authentication interface 1470 includes, for example, a database for face authentication.

In the following specific example of the operation, the controller 1410 determines the face authentication by searching the database for the face authentication included in the user authentication interface 1470. Instead of the controller 1410, the user authentication interface 1470 may have a control function for face authentication. In any case, by sharing the position detecting part 1430, duplication due to separately providing the user authentication function can be avoided, and an efficient control system can be made.

In step S11 as shown in FIG. 18, the position detecting part 1430 acquires image data (the second image data) including information of the face of the user. Here, "user" refers to the person that will be the observer O1 when the authentication is OK in the face authentication. The control system 1001 is interlocked until the determination of the face authentication is passed.

For example, the controller 1410 starts the processing of step S11 and subsequent steps after the user is detected to be seated on the seat. Also, in step S11 and before step S11, the controller 1410 may prohibit the startup of the operation control system of the vehicle, and may release the prohibition of the startup of the operation control system when the user authentication is determined to be OK. For example, the startup of the operation control system allows the engine to be started.

In step S12, the image processor 1434 extracts data for the face authentication by performing image analysis of the acquired image data, and transmits the result to the controller 1410. The data for the face authentication is, for example, a feature acquired from the image data, and is the position, size, ratio, shape, etc., of an eye, nose, mouth, etc.

In step S13, the controller 1410 searches the database in the user authentication interface 1470.

In step 514, the controller 1410 determines the presence or absence of data matching the data extracted from the image data, and causes the processing to transition to step S15 when matching data is found. When there is no matching data, the processing transitions to step S16, and the processing ends because the authentication is not possible.

In step S15, the controller 1410 determines that the data for the face authentication was found and the authentication is OK, and releases the interlock of the control system 1001. Thereafter, the controller 1410 adjusts the formation position of the floating image I1 by performing the procedure of the flowchart shown in FIG. 17.

In the description described above, the user authentication is not limited to face authentication as long as image data that includes information related to a portion of the body of the user acquired by the position detecting part 1430 can be acquired. For example, the user authentication may be iris authentication, fingerprint authentication, or vein authentication.

The user authentication interface described above is not limited to being applied to the image display device 1000 according to the embodiment, and is applicable to image display devices according to other embodiments described below.

For example, in image display devices 3000 and 4000 according to third and fourth embodiments described below with reference to FIGS. 22 and 25, the imaging part 1432 images the appearance of the user looking into the floating image. The pupil of the imaging part 1432 when viewing the floating image can be imaged from substantially the front of the user, and an image that includes the entire pupil of the user can be acquired. Therefore, in the image display devices 3000 and 4000, an image that includes the iris can be clearly imaged, and the accuracy of the user authentication can be increased.

In fingerprint authentication or vein authentication, it is necessary to use image data imaged by infrared irradiation. An image display device 5000 according to a fifth embodiment described below with reference to FIG. 26 includes an imaging part 5432 that responds to infrared, and therefore can be utilized as-is to perform user authentication.

Effects of the image display device 1000 according to the embodiment will now be described.

The image display device 1000 according to the embodiment includes the imaging element 310*a*. In the imaging element 310*a* as shown in FIG. 8, FIG. 12B, etc., the angles of the dihedral corner reflectors 30 with respect to the virtual plane P0 are set to be greater than 0° and less than 90°. Also, the angles of the dihedral corner reflectors 30 with respect to the virtual plane P0 are set to be different according to the position at which the dihedral corner reflector 30 is located in the Y2-axial direction, are set to increase away from the dihedral corner reflector 30 of the reference position in one direction of the Y2-axial direction, and are set to decrease away from the dihedral corner reflector 30 in the other direction of the Y2-axial direction. By such a setting, the light ray from the first surface 311*a* side with respect to the base member 312 can be reflected twice, and a floating image can be formed at the first surface 311*a* side.

In the imaging element 310*a*, by appropriately setting the angles of the dihedral corner reflectors 30 with respect to the virtual plane P0, the display device 1100(S) can be located at any position at the first surface 311*a* side with respect to the base member 312, and the floating image I1 can be formed at the desired position directly above the reflector array.

The image display device 1000 according to the embodiment includes the position detecting part 1430, the controller 1410, and the driver 1420. The position detecting part 1430 detects the pupil position of the observer O1 based on image data including information of the pupil position of the observer O1. The controller 1410 calculates the appropriate position to form the floating image I1 based on the pupil position, and the driver 1420 modifies the position and angle of the display device 1100(S) so that the floating image I1 is formed at the calculated position. Therefore, the image display device 1000 can form the floating image I1 at the appropriate position according to the pupil position of the observer O1.

The image display device 1000 according to the embodiment may continuously acquire the image data, calculate the pupil position for each set of image data, and generate drive signals to set the position and angle of the display device 1100(S). As a result, the image display device 1000 can modify the position at which the floating image I1 is formed in real time according to the movement of the pupil of the observer O1.

In the image display device 1000, the display device 1100(S) and the imaging element 310*a* are arranged to form the floating image I1 directly above the imaging element 310*a*. Therefore, according to the position at which the observer O1 views the floating image I1, ghosts may be visible at positions other than the position at which the floating image I1 is formed. In the image display device 1000 as described above, because the position at which the floating image I1 is formed is set by being appropriately modified according to the position of the observer O1, a clear and stable mid-air image can be displayed to the observer O1 as the floating image I1.

The image display device 1000 further includes the user interface 1460. The user interface 1460 transmits the signal generated by the operation of the observer O1 to the controller 1410. The controller 1410 can operate or not operate the display device 1100(S) according to the signal generated by the user interface 1460. Therefore, the image display device 1000 can switch between displaying or not displaying the floating image I1 according to the operation of the observer O1. Also, the user interface 1460 can generate a drive signal to set the position and angle of the display device 1100(S). Therefore, the image display device 1000 can form the floating image I1 at the position set by the observer O1.

The display device 1100(S) can include an LED element in the pixel, and the LED element can be formed of a gallium nitride compound semiconductor. An LED element that is formed of a gallium nitride compound semiconductor can emit light of high luminance with low power consumption. Therefore, a clear image can be displayed in mid-air even when the light emitted from the display device 1100(S) travels along a long optical path.

Second Embodiment

Figure 19:
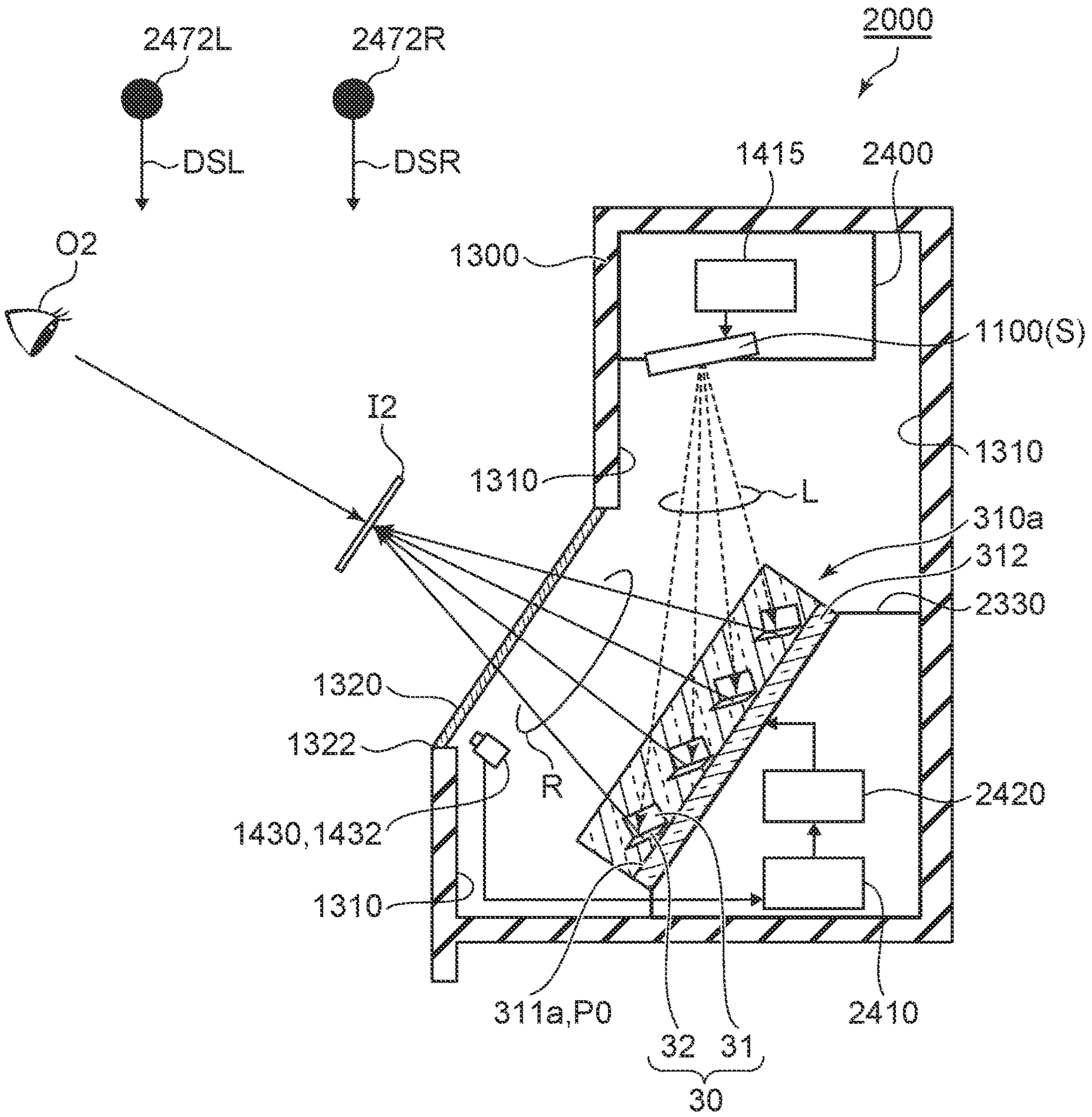
FIG. 19 is a schematic cross-sectional view illustrating an image display device according to a second embodiment.

FIG. 19 is a schematic cross-sectional view illustrating an image display device according to a second embodiment.

As shown in FIG. 19, the image display device 2000 according to the embodiment modifies the position of the imaging element 310*a* and the angle at which the reflected light R is emitted by performing six-axis control of the imaging element 310*a* instead of six-axis control of the display device 1100(S). The image display device 2000 thereby modifies the position at which a floating image 12 is formed.

The image display device 2000 includes the imaging element 310*a*, the display device 1100(S), the position detecting part 1430, a controller 2410, and a driver 2420. The image display device 2000 differs from the image display device 1000 according to the first embodiment in that the position of the imaging element 310*a* and the angle at which the reflected light R is emitted are modified by six-axis control. The image display device 2000 also differs in that the imaging part 1432 images the observer O1 via the window member 1320. Otherwise, the image display device 2000 has the same configuration as the image display device 1000 according to the first embodiment. The same components are marked with the same reference numerals, and a repeated detailed description is omitted as appropriate.

In the image display device 2000, similarly to the image display device 1000 shown in FIG. 1, the display device 1100(S), the imaging element 310*a*, the controller 2410, the driver 2420, and the position detecting part 1430 are located in the housing 1300. Similarly to the image display device 1000, the light-shielding member 1310 is located at the interior wall of the housing 1300. The display device 1100 (S) is located at the upper portion inside the housing 1300, and the imaging element 310*a* is located at the lower portion inside the housing 1300.

The light L that is emitted by the display device 1100(S) is incident on the imaging element 310*a*, and the imaging element 310*a* emits the reflected light R in the normal direction of the virtual plane P0 and the first surface 311*a* of the imaging element 310*a*. The imaging element 310*a* is located in an imaging element mounting part 2330 provided to support the direction in which the reflected light R is emitted.

Figure 20:
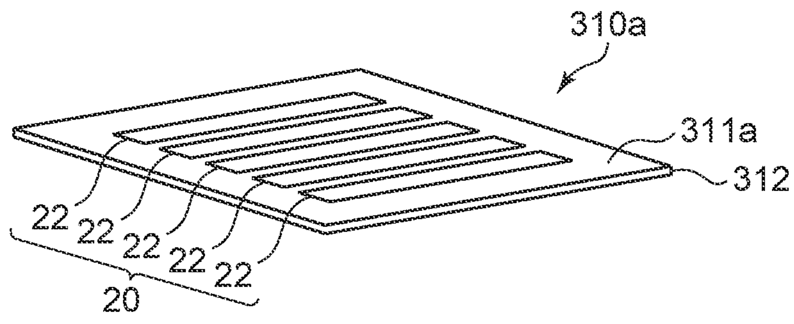
FIG. 20 is a schematic view for describing a portion, i.e., a range of movement of an imaging element, of the image display device according to the second embodiment.
Figure 20:
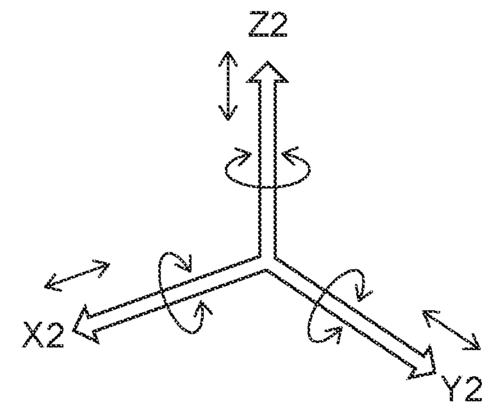

FIG. 20 is a schematic view for describing a portion, i.e., the range of movement of the imaging element, of the image display device according to the second embodiment.

As shown in FIG. 20, the imaging element 310*a* is controlled in six axes by the controller 2410 and the driver 2420, and is movable with six degrees of freedom. For example, the driver 2420 that is adapted to six-axis control is an articulated arm, and the imaging element 310*a* is located at the tip of the articulated arm.

Specifically, as a first degree of freedom, the imaging element 310*a* is movable in a direction parallel to the X2-axis. As a second degree of freedom, the imaging element 310*a* is movable in a direction parallel to the Y2-axis. As a third degree of freedom, the imaging element 310*a* is movable in the Z2-axial direction. By having the first to third degrees of freedom, the imaging element 310*a* can be moved to any position in X2Y2Z2-coordinate space.

As a fourth degree of freedom, the imaging element 310*a* is rotatable around the X2-axis. As a fifth degree of freedom, the imaging element 310*a* is rotatable around the Y2-axis. As a sixth degree of freedom, the imaging element 310*a* is rotatable around the Z2-axis. The first surface 311*a* of the imaging element 310*a* can face any direction, and the floating image 12 can be formed by reflecting the reflected light R in any direction.

Because the image display device 2000 includes the controller 2410 and the driver 2420 that are adapted to six-axis control, the imaging element 310*a* can emit the reflected light R toward any position in any direction. By performing six-axis control of the imaging element 310*a*, the image display device 1000 can form the floating image 12 at the desired position in mid-air by using the imaging element 310*a* to reflect the light L emitted from the display device 1100(S).

Because the imaging part 1432 is located behind the position at which the floating image 12 is formed when viewed from an observer O2, the position of the pupil when the observer O2 views the imaging part 1432 can substantially match the pupil position when the observer O2 views the floating image 12. Therefore, the image display device 2000 can set the position of the floating image 12 according to the pupil position of the observer O2 with a small error.

According to the second embodiment, information related to the distance between the observer O2 and the image display device 2000 may be calculated based on a voice emitted by the observer O2. Microphones 2472L and 2472R are provided, and the image display device 2000 is connected to the microphones 2472L and 2472R. The microphones 2472L and 2472R collect the voice emitted by the observer O2 at the left and right of the position of the observer O2, convert the voice into left and right voice data DSL and DSR, and transmit the voice data DSL and DSR to the image display device 2000. The image display device 2000 calculates the position of the observer O2 based on the left and right voice data DSL and DSR. The image display device 2000 detects the pupil position of the observer O2 based on image data including data of the position of the observer O2 and information of the pupil position of the observer O2.

According to the second embodiment, the controller 2410 and the driver 2420 are located inside the imaging element mounting part 2330. The display device 1100(S) is located inside a display module 2400 together with a display controller 1415 that controls the image display of the display device 1100(S). The display module 2400 supports the display device 1100(S) at the upper portion inside the housing 1300.

Figure 21:
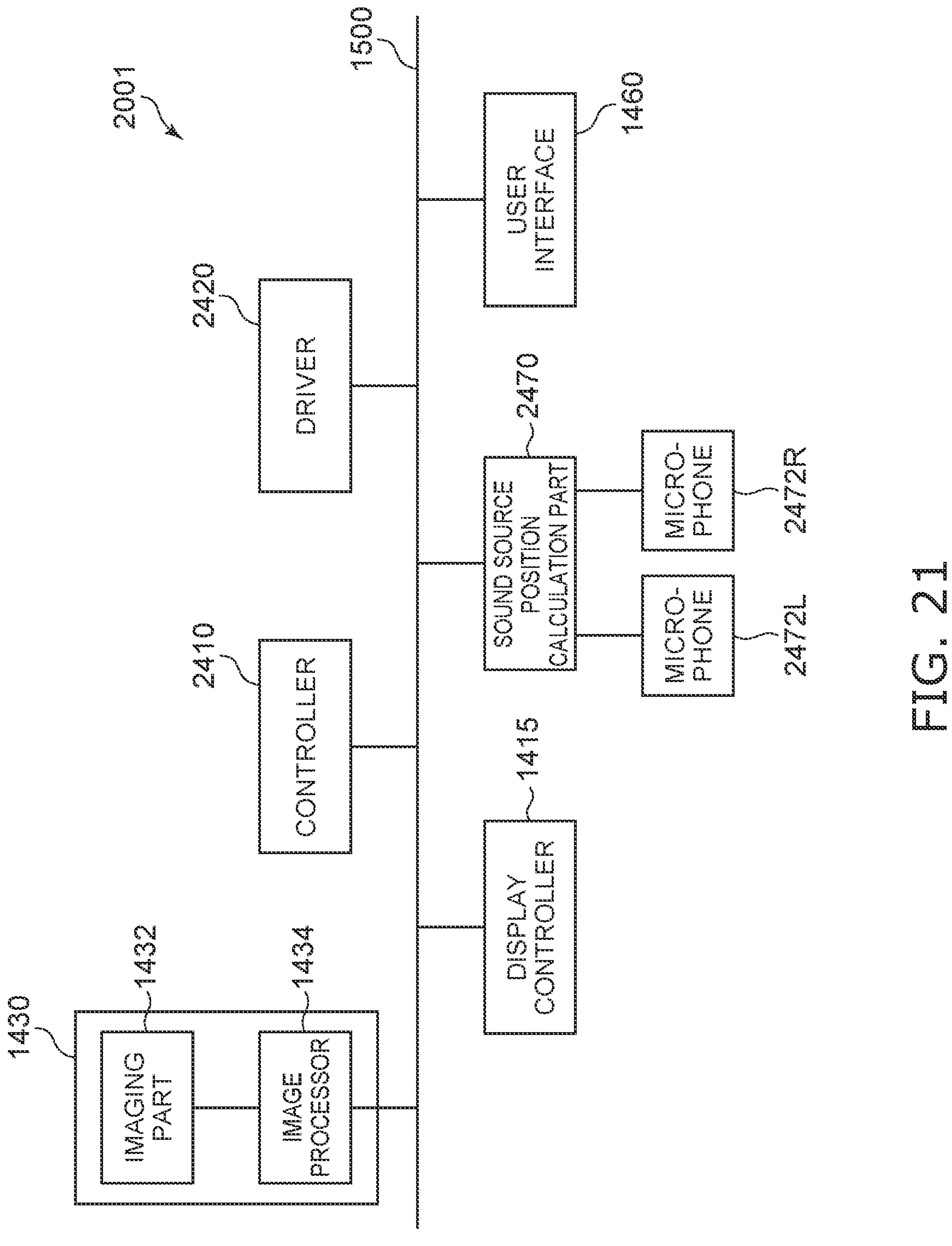
FIG. 21 is an example of a schematic block diagram illustrating a control system of the image display device according to the second embodiment.

FIG. 21 is an example of a schematic block diagram illustrating a control system of the image display device according to the second embodiment.

An operation of the image display device 2000 according to the embodiment will now be described.

As shown in FIG. 21, the control system 2001 of the image display device 2000 includes the position detecting part 1430, the controller 2410, the driver 2420, the display controller 1415, a sound source position calculation part 2470, and the user interface 1460. The position detecting part 1430, the controller 2410, the driver 2420, the display controller 1415, the sound source position calculation part 2470, and the user interface 1460 are communicatably connected via the communication network 1500. Similarly to the image display device 1000 shown in FIG. 1, the image display device 2000 is mounted in a transportation vehicle such as a private automobile, etc. The observer O2 is, for example, the driver of the vehicle in which the image display device 2000 is mounted. The communication network 1500 is, for example, an automotive ethernet, etc.

The position detecting part 1430 and the user interface 1460 are similar to those of the image display device 1000 according to the first embodiment, and a detailed description is omitted. The controller 2410 and the driver 2420 correspond respectively to the controller 1410 and the driver 1420 of the image display device 1000 according to the first embodiment. The image display device 2000 differs in that six-axis control of the imaging element 310*a* is performed instead of six-axis control of the display device 1100(S). The difference between the six-axis control of the display device 1100(S) and the six-axis control of the imaging element 310*a* is a difference of the calculation procedure of the optical path, and because there is no operational difference, a detailed description is omitted.

In the specific example, instead of the camera lighting 1440 shown in FIGS. 1 and 16, the display controller 1415 and the display device 1100(S) provide illumination of the observer O2 when imaging. The display controller 1415 includes a lit period in which, for example, all of the pixels of the display device 1100(S) are fully lit at a prescribed luminance between display periods in which the data of the image displayed by the display device 1100(S) is supplied. By synchronizing the lit period with the period of imaging the observer O2, the controller 2410 can acquire a clear image of the observer O2.

The sound source position calculation part 2470 is connected to the microphones 2472L and 2472R and acquires information related to the voice of the observer O2 as the left and right voice data DSL and DSR. The sound source position calculation part 2470 calculates the position of the observer O2 based on the left and right voice data DSL and DSR emitted by the observer O2. The image processor 1434 detects the pupil position of the observer O2 based on image data including the information of the pupil position of the observer O2 and the position of the observer O2 estimated as the sound source position.

The sound source position calculation part 2470 may be interlocked with the user authentication interface 1470 described with reference to FIG. 16. For example, the user authentication interface 1470 may provide an interface for voice print authentication, and may use the voice data to detect the position of the observer O2 when user authentication is performed for the voice of the observer O2. The sound source position calculation part 2470 may utilize voice data from three or more microphones to calculate the position of the observer O2.

Similarly to the first embodiment, the controller 2410 calculates the position of the floating image 12 based on the pupil position of the observer O2 detected by the image processor 1434. Subsequently, the controller 2410 generates a drive signal to form the floating image 12 at the calculated position, and the driver 2420 modifies the position of the imaging element 310*a* and the angle at which the reflected light R is emitted based on the drive signal.

Effects of the image display device 2000 according to the embodiment will now be described.

The image display device 2000 according to the embodiment has effects similar to those of the image display device 1000 according to the first embodiment. Namely, the image display device 2000 can form the floating image 12 at an appropriate position according to the pupil position of the observer O2. Effects similar to when six-axis control of the display device 1100(S) is performed can be obtained for six-axis control of the imaging element 310*a* as well.

In the image display device 2000 according to the embodiment, the imaging part 1432 is positioned to image the observer O2 via the window member 1320 through which the reflected light R of the imaging element 310*a* is emitted. Therefore, the line of sight of the observer O2 viewing the imaging part 1432 can be substantially aligned with the line of sight when viewing the floating image 12, and the image display device 2000 can more accurately calculate the position at which the floating image 12 is formed.

Although the image display device 2000 calculates the position of the observer O2 by using voice data of the observer O2 to calculate the sound source position in the specific example above, the image display device 2000 is not limited thereto. For example, as described with reference to FIG. 16, the position of the observer O2 may be set by detecting the seat position.

Third Embodiment

Figure 22:
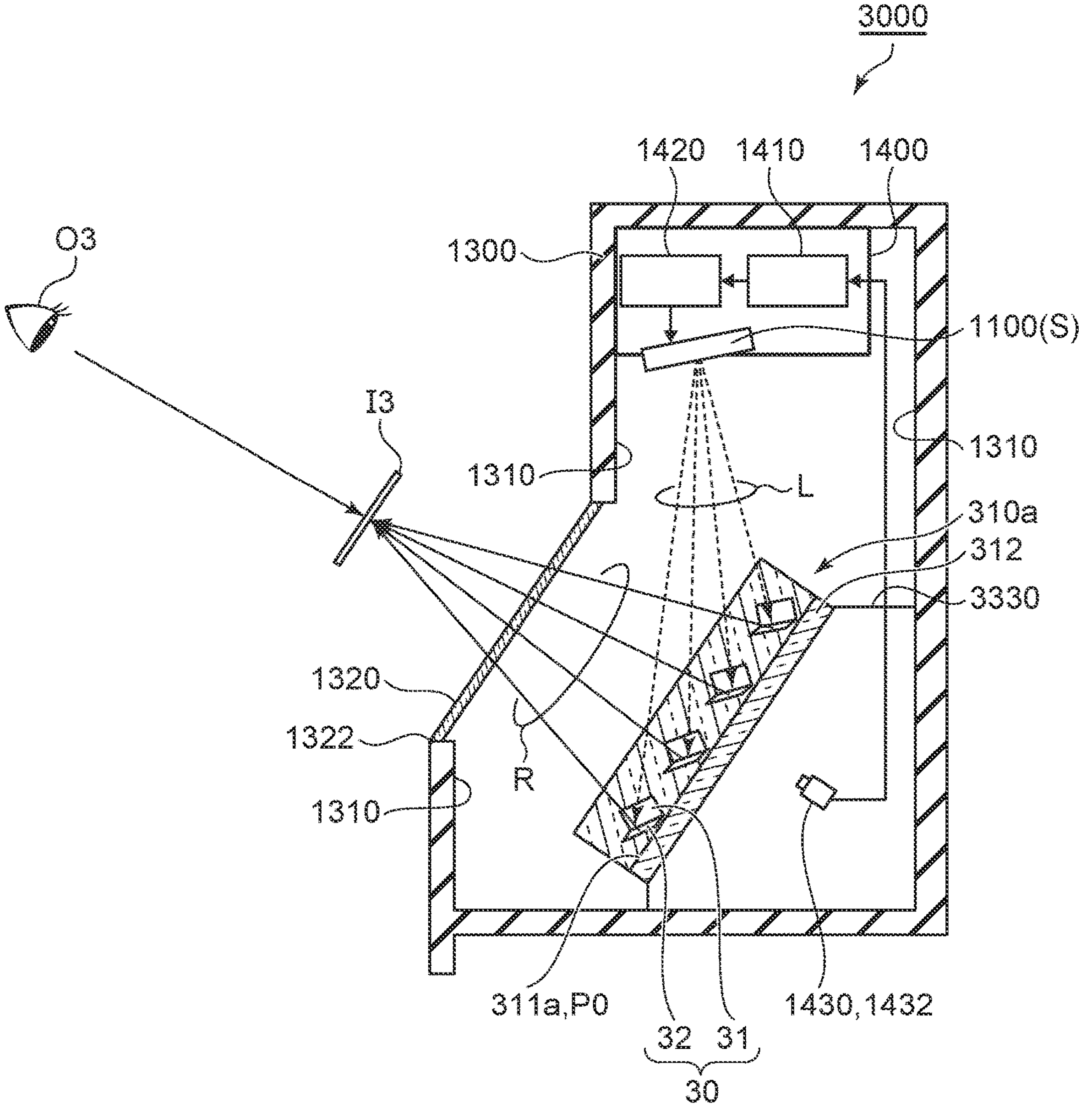
FIG. 22 is a schematic cross-sectional view illustrating an image display device according to a third embodiment.

FIG. 22 is a schematic cross-sectional view illustrating an image display device according to a third embodiment.

As shown in FIG. 22, the image display device 3000 according to the embodiment includes the imaging element 310*a*, the display device 1100(S), the position detecting part 1430, the controller 1410, and the driver 1420. The imaging element 310*a*, the display device 1100(S), the position detecting part 1430, the controller 1410, and the driver 1420 are located inside the housing 1300. The location of the imaging part 1432 of the image display device 3000 is different from that of the image display device 1000 according to the first embodiment. Otherwise, the components of the image display device 3000 are the same as the components of the image display device 1000 according to the first embodiment; the same components are marked with the same reference numerals, and a repeated detailed description is omitted as appropriate.

In the image display device 3000, the imaging element 310*a* is located between the position at which a floating image 13 is formed and the position at which the imaging part 1432 is located. Therefore, the imaging part 1432 images an observer O3 via the imaging element 310*a*. The base member 312 of the imaging element 310*a* is formed of a light-transmitting material so that the imaging part 1432 can image the observer O3.

By arranging the imaging part 1432 as described above, the imaging part 1432 can image the observer O3 looking into the floating image 13. The imaging part 1432 can acquire an image that includes the pupil position of the observer O3 viewing the floating image 13. Therefore, the position detecting part 1430 can acquire image data including more accurate information of the pupil position.

In the image display device 3000, the imaging part 1432 images the observer O3 via the imaging element 310*a*. On the other hand, the light L from the display device 1100(S) is incident on the imaging element 310*a*, and the imaging element 310*a* emits the reflected light R toward the observer O3. If the timing of the imaging of the observer O3 and the timing of the imaging element 310*a* emitting the reflected light R overlap, the imaging part 1432 images the observer O3 irradiated with the reflected light R. Therefore, there is a risk that the reflected light R that is irradiated on the observer O3 may become noise in the acquired image data, and the information related to the pupil position of the observer O3 may be unclear.

Therefore, in the image display device 3000, the controller 1410 controls the timing of the imaging and the timing of the display device 1100(S) emitting the light not to overlap. Specifically, the controller 1410 images the observer O3 in a first period T1, and stops imaging in the other periods. The controller 1410 operates the display device 1100(S) in a second period T2 that does not overlap the first period T1, and stops operating the display device 1100(S) in the other periods. The image display device 3000 can acquire image data including more accurate information related to the pupil position of the observer O3.

Figure 23:
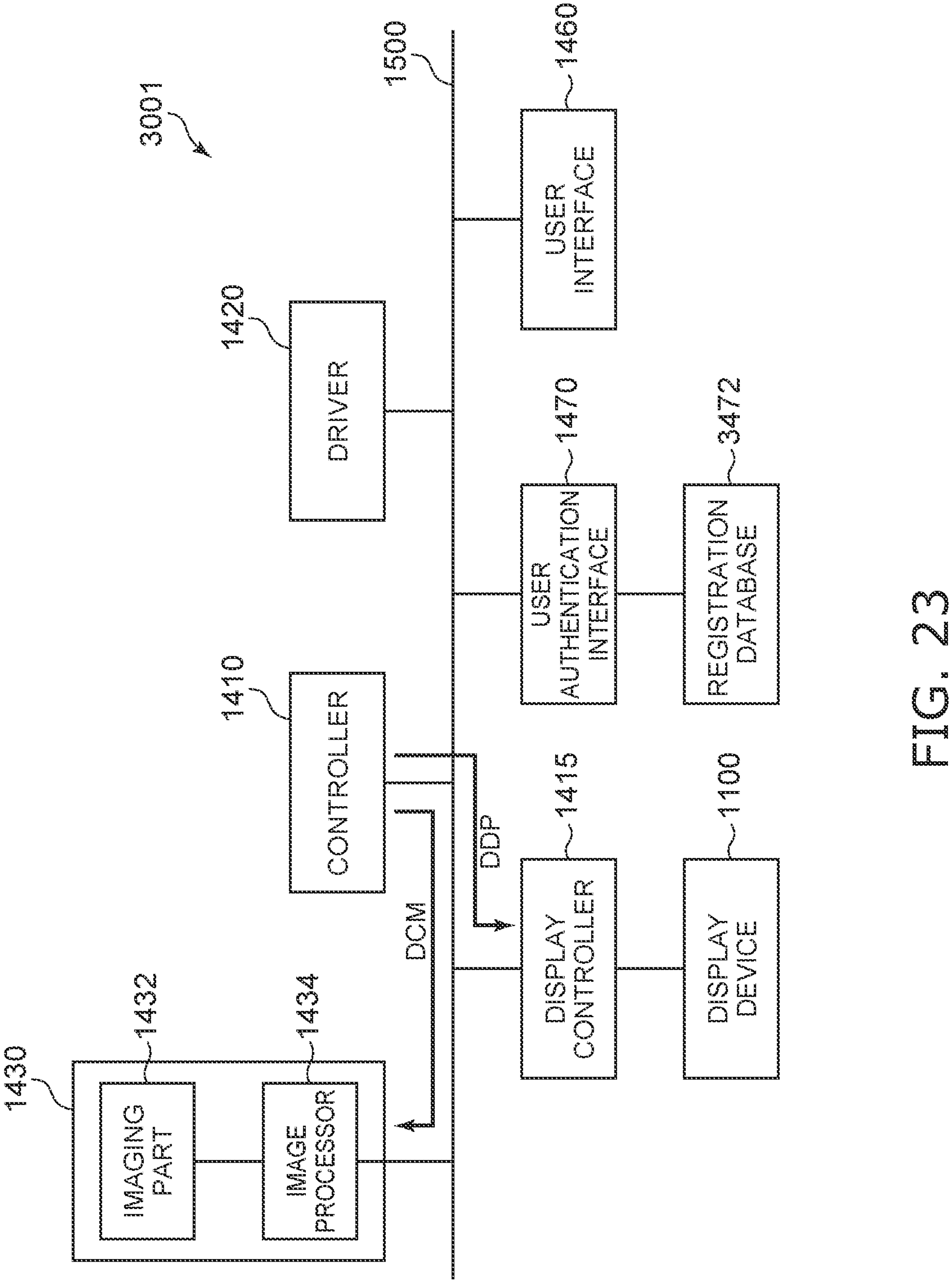
FIG. 23 is an example of a schematic block diagram illustrating a control system of the image display device according to the third embodiment.

FIG. 23 is an example of a schematic block diagram illustrating a control system of the image display device according to the third embodiment.

As shown in FIG. 23, the control system 3001 of the image display device 3000 includes the position detecting part 1430, the controller 1410, the driver 1420, the display controller 1415, the user authentication interface 1470, and the user interface 1460. The position detecting part 1430, the controller 1410, the driver 1420, the display controller 1415, the user authentication interface 1470, and the user interface 1460 are communicatably connected via the communication network 1500. For example, the image display device is mounted in a transportation vehicle such as a private automobile, etc., and the observer O3 shown in FIG. 22 is, for example, the driver of the vehicle in which the image display device 3000 is mounted.

In the control system 3001, the controller 1410 transmits, to the imaging part 1432, an imaging signal DCM to set the timing of imaging the image of the observer O3. The imaging part 1432 images the observer O3 in the first period of the imaging signal. The controller 1410 transmits, to the display controller 1415, a lighting signal DDP to set the timing of the display device 1100(S) emitting the light. The display controller 1415 operates the display device 1100(S) in the second period of the lighting signal DDP.

The user authentication interface 1470 is an interface for face authentication of the user described with reference to FIG. 16. In the example, the user authentication interface 1470 includes a registration database 3472, and the registration database 3472 includes feature data for face authentication, as well as data related to the positions of both eyes of the registrant. When the observer O3 is authenticated as a user, the controller 1410 calculates the pupil position of the observer O3 based on image data including information of the pupil position of the observer O3 and data related to the positions of both eyes.

Similarly to the first embodiment, the controller 1410 calculates the position of the floating image 13 based on the pupil position of the observer O3 detected by the image processor 1434. The controller 1410 generates a drive signal to form the floating image 13 at the calculated position, and the driver 1420 moves the display device 1100(S) based on the drive signal.

Figure 24:
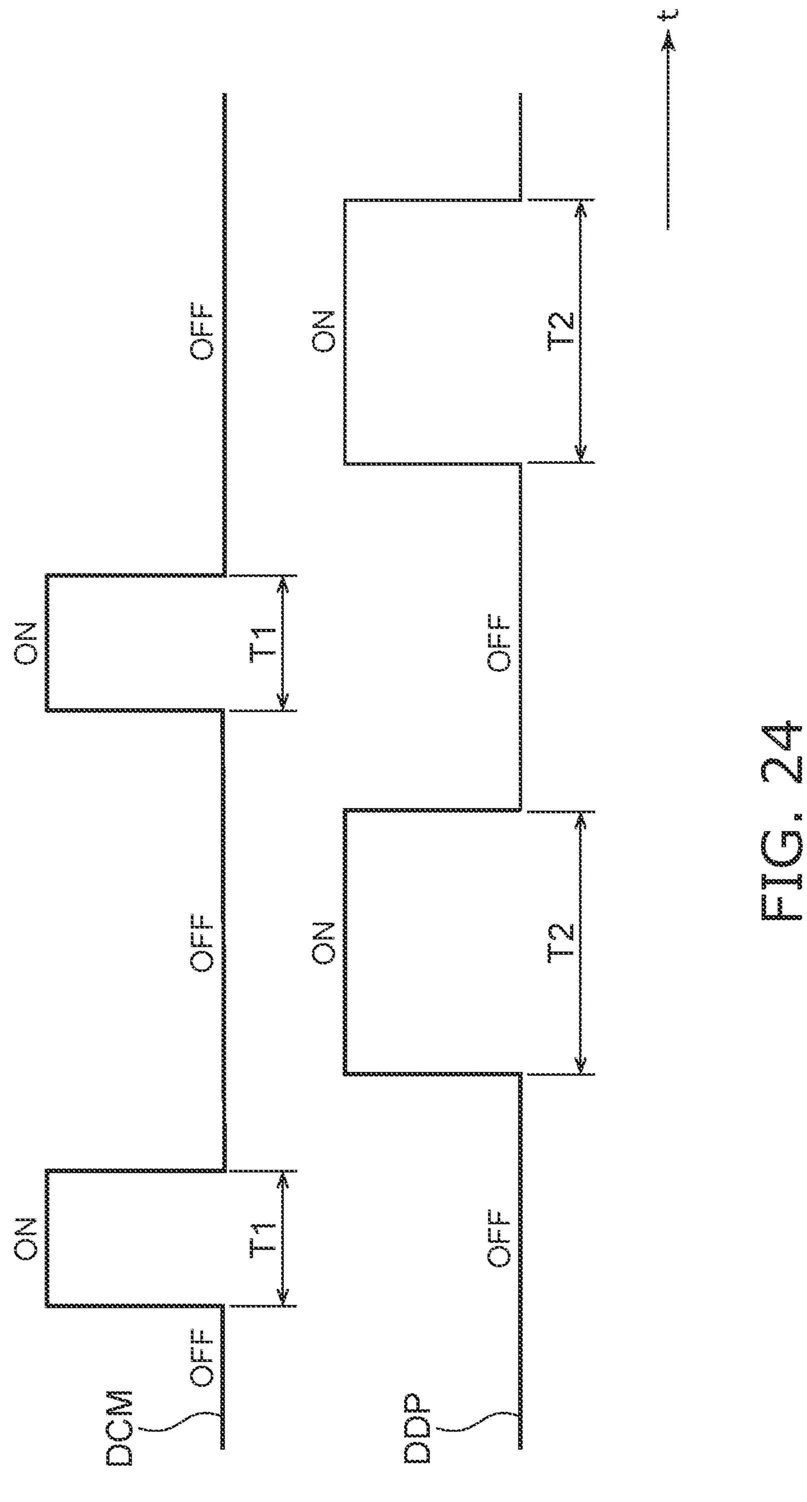
FIG. 24 is an example of a schematic timing chart for describing an operation of the image display device according to the third embodiment.

FIG. 24 is an example of a schematic timing chart for describing an operation of the image display device according to the third embodiment.

FIG. 24 shows the relationship between the first period T1 and the second period T2. The upper diagram of FIG. 24 illustrates the temporal change of the imaging signal DCM, which is the command of the controller 1410 for the position detecting part 1430 to image the image. The lower diagram of FIG. 24 illustrates the temporal change of the lighting signal DDP, which is the command of the controller 1410 for the display controller 1415 to operate the display device 1100(S).

As shown in FIG. 24, the imaging signal DCM is on and images the observer O3 in the first period T1. In the periods other than the first period T1, the imaging signal DCM is switched off, and the imaging operation is stopped. In the second period T2, the lighting signal DDP is on, and the display controller 1415 outputs an operation permission signal to the display device 1100(S). According to the operation permission signal, the display device 1100(S) displays an image that is set. In the periods other than the second period T2, the lighting signal DDP is switched off, and the display controller 1415 outputs an operation stop signal to the display device 1100(S). According to the operation stop signal, the display device 1100(S) stops the display of the image that is set. The second period T2 is set not to overlap the first period T1.

In the imaging signal DCM and the lighting signal DDP, the first period T1 and the second period T2 may be set to be repeatedly on as in the example shown in FIG. 24. For example, the cycle lengths in which the first period T1 and the second period T2 are on are constant. By repeating the imaging and the display of the image at a constant cycle length, the floating image 13 can be displayed by moving the floating image 13 to the appropriate position according to the movement of the pupil of the observer O3.

Although the position at which the floating image 13 is formed is modified by modifying the position and/or angle of the display device 1100(S) by six-axis control in the specific example above, the modification is not limited thereto, and the formation position of the floating image may be modified by modifying the position and/or angle of the imaging element 310*a* by six-axis control.

To calculate the pupil position, instead of a database related to the eye position for each registrant, the seat position may be used, and/or voice data of the observer O3 may be used.

Effects of the image display device 3000 according to the embodiment will now be described.

The image display device 3000 according to the embodiment has effects similar to the image display device 1000 according to the first embodiment. Also, by positioning the position detecting part 1430 to image the observer O3 via the imaging element 310*a*, the position detecting part 1430 can acquire an image that more accurately reflects the pupil position of the observer O3. By more accurately calculating the pupil position of the observer O3, a formation position of the floating image 13 that is more clearly viewed by the observer O3 can be calculated.

Fourth Embodiment

Figure 25:
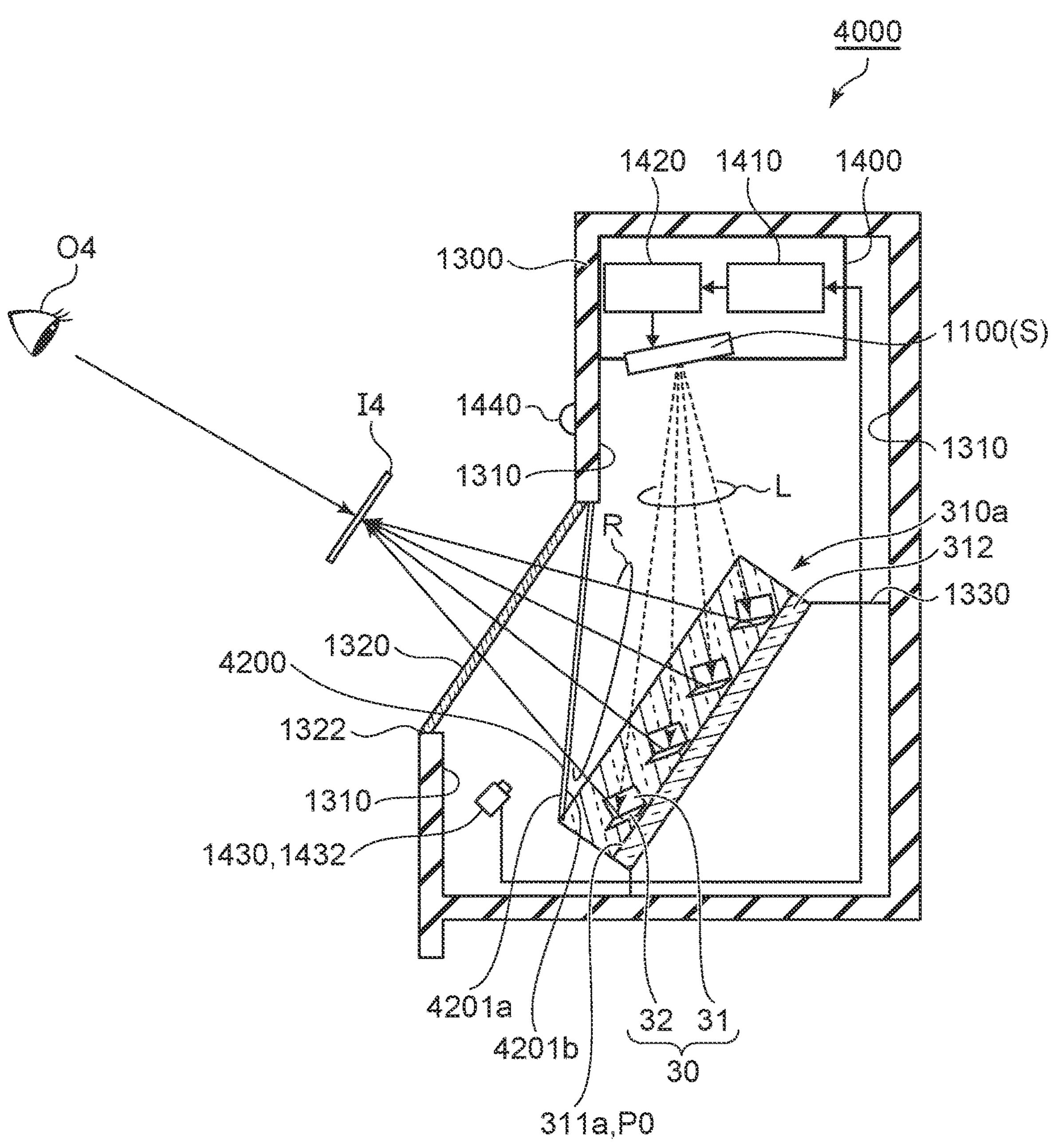
FIG. 25 is a schematic cross-sectional view illustrating an image display device according to a fourth embodiment.

FIG. 25 is a schematic cross-sectional view illustrating an image display device according to a fourth embodiment.

As shown in FIG. 25, the image display device 4000 according to the embodiment includes the imaging element 310*a*, the display device 1100(S), the position detecting part 1430, the controller 1410, the driver 1420, and a half mirror 4200.

The half mirror 4200 is located inside the housing 1300 together with the imaging element 310*a*, the display device 1100(S), the controller 1410, and the driver 1420. The half mirror 4200 is located between the position of an observer O4 and the position of the imaging element 310*a*. The half mirror 4200 includes surfaces 4201*a* and 4201*b*. The surface 4201*b* is positioned at the side opposite to the surface 4201*a*.

The half mirror 4200 is arranged so that the surface 4201*a* faces outside the housing 1300, and the surface 4201*b* faces inside the housing 1300. Therefore, the half mirror 4200 transmits light traveling out of the housing 1300 from the interior, and reflects at least a portion of the light traveling into the housing 1300 from the outside.

The imaging element 310*a* is located at the surface 4201*b* side of the half mirror 4200. Therefore, the reflected light R that is emitted by the imaging element 310*a* is emitted from the housing 1300 via the half mirror 4200, and the observer O4 can observe a floating image 14 formed by the reflected light R of the imaging element 310*a*.

Because the observer O4 is positioned at the surface 4201*a* side of the half mirror 4200, the surface 4201*a* forms a reflected image of the observer O4. Because the imaging part 1432 is located at the surface 4201*a* side of the half mirror 4200, the imaging part 1432 images the reflected image of the observer O4 on the surface 4201*a*. The imaging part 1432 can generate image data including information of the pupil position of the observer O4 by setting the imaging region to capture an image in which the reflected image of the observer O4 includes the pupil of the observer O4. The position detecting part 1430 can calculate the pupil position of the observer O4 based on the image data including the information of the pupil position of the observer O4.

In the example, by providing the imaging part 1432 inside the housing 1300, the imaging part 1432 can be invisible to the observer O4. The imaging part 1432 images the appearance of the observer O4 viewing the floating image 14.

The controller 1410 and the driver 1420 operate similarly to those of the image display device 1000 according to the first embodiment. In other words, the controller 1410 calculates the position at which the floating image 14 is formed based on the pupil position of the observer O4, and the driver 1420 modifies the position of the display device 1100(S) and the angle at which the light is emitted to match the calculated position.

When the controller 1410 calculates the pupil position of the observer O4, the seat position and/or features of the face authentication database related to the voice and/or the voice and the pupil position of the observer O4 may be used as in the image display devices 1000 to 3000 according to the other embodiment described above.

Instead of six-axis control of the display device 1100(S), the position at which the floating image 14 is formed may be modified by six-axis control of the imaging element 310*a* similarly to the image display device 2000 according to the second embodiment.

Effects of the image display device 4000 according to the embodiment will now be described.

The image display device 4000 according to the embodiment has effects similar to those of the image display device 1000 according to the first embodiment. Furthermore, in the image display device 4000 according to the embodiment, the imaging part 1432 is located at the side at which the observer O4 is positioned, and images the reflected image of the observer O4. By appropriately setting the imaging region of the imaging part 1432, the appearance of the observer O4 viewing the floating image 14 can be imaged from substantially the front of the observer O4. Therefore, the pupil position of the observer O4 can be substantially aligned with the pupil position when viewing the floating image 14, and the controller 1410 can calculate the position at which the floating image 14 is formed more accurately.

The imaging part 1432 can be located inside the housing 1300 where the imaging part 1432 is invisible to the observer O4. The observer O4 is not aware of the imaging part 1432, and the position detecting part 1430 can calculate the pupil position of the observer O4 more accurately because the pupil position of the observer O4 does not need to be shifted from the position at which the floating image 14 is viewed.

Fifth Embodiment

Figure 26:
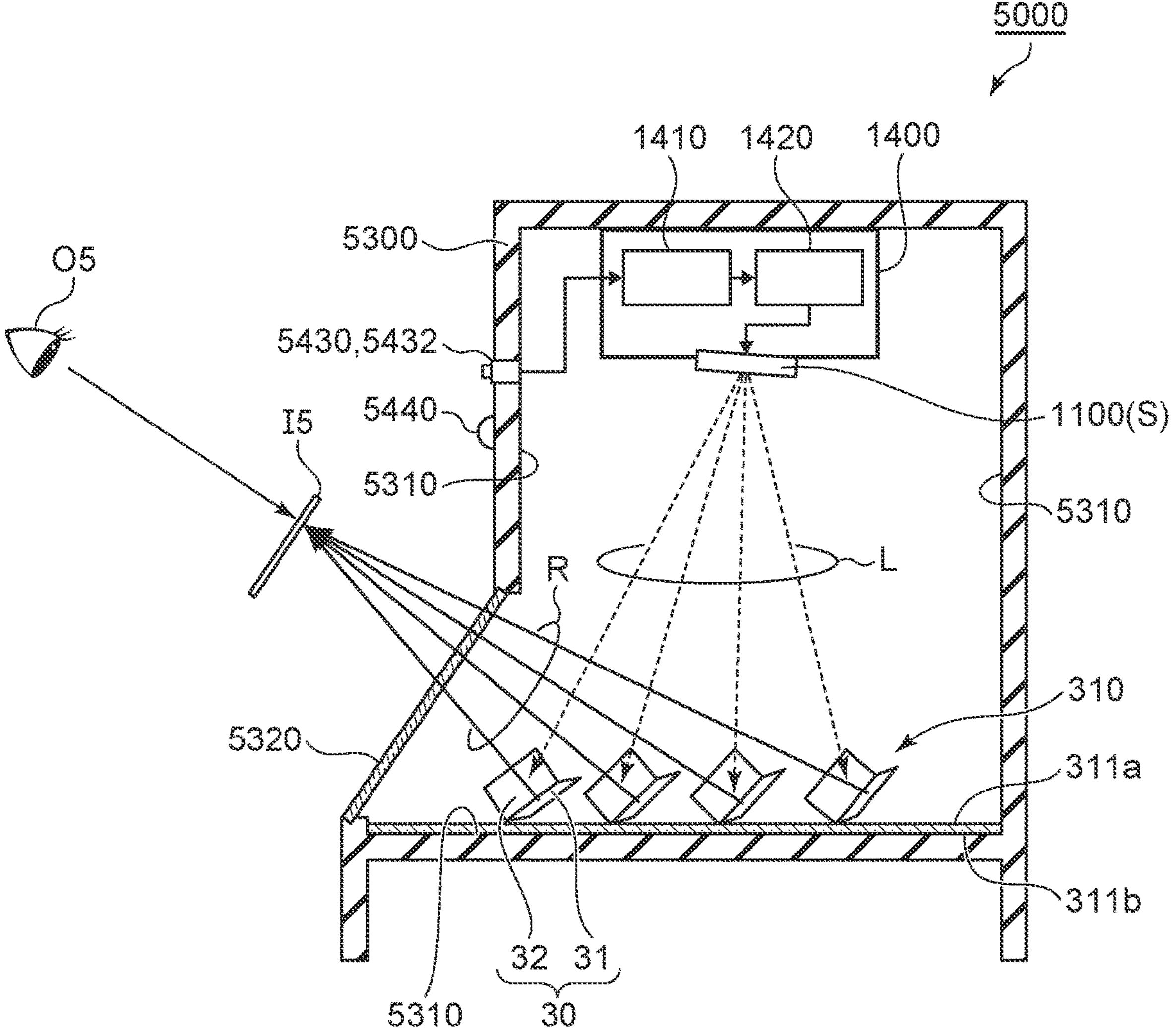
FIG. 26 is a schematic cross-sectional view illustrating an image display device according to a fifth embodiment.

FIG. 26 is a schematic cross-sectional view illustrating an image display device according to a fifth embodiment.

As shown in FIG. 26, the image display device 5000 according to the embodiment includes an imaging element 310, the display device 1100(S), the imaging part 5432, camera lighting 5440, the controller 1410, and the driver 1420. According to the fifth embodiment, the imaging element 310, the display device 1100(S), a portion of the imaging part 5432, a portion of the camera lighting 5440, the controller 1410, and the driver 1420 are located inside a housing 5300. An opening is provided in the housing 5300, and a window member 5320 is located in the opening of the housing 5300. The imaging part 5432 is arranged to image an observer O5 positioned outside the housing 5300. The camera lighting 5440 is arranged to illuminate the observer O5.

The imaging part 1432 of the image display devices 1000 to 4000 according to the other embodiments described above respond to light of wavelengths in the same range as the wavelength of the light L emitted by the display device 1100(S) or in a range including at least a portion of the wavelength of the light L. In contrast, the imaging part 5432 of the image display device 5000 according to the embodiment respond to light of a wavelength (a first wavelength) that is different from the range of the wavelength of the light L emitted by the display device 1100(S). The camera lighting 5440 irradiates, on the observer O5, light of a wavelength to which the imaging part 5432 responds but is different from the range of the wavelength of the light L emitted by the display device 1100(S).

The display device 1100(S) emits visible light, and the imaging part 5432 responds to, for example, infrared having a peak wavelength of not less than 700 nm. The camera lighting 5440 radiates infrared having a peak wavelength of not less than 700 nm. When the display device 1100(S) emits light of wavelengths of a portion of visible light wavelengths, the wavelength of the light responded to by the imaging part 5432 and the wavelength of the light radiated by the camera lighting 5440 are not limited to being 700 nm or more, and only need to be different from the wavelength of the light emitted by the display device 1100(S).

There are cases where the range of the wavelength of the light L emitted from the display device 1100(S) is shifted due to the air inside and outside the housing 5300 and by the reflections of the window member 5320 and the imaging element 310. The range of the wavelength of the light responded to by the imaging part 5432 and radiated by the camera lighting 5440 is set by considering such a shift amount.

In the image display device 5000, the imaging element 310 is different from the imaging element 310*a* of the other embodiments described above. As described with reference to FIGS. 12A and 12B, the imaging element can be selected as appropriate from the imaging elements 10, 310, and 310*a* according to the space inside the housing, the mounting location of the image display device, etc.

The relationship between the position of the display device 1100(S) and the position of the imaging element 310 of the image display device 5000 is different from those of the other embodiments described above. In the image display device 5000, the display device 1100(S) is located directly above the imaging element 310. Therefore, the light L that is emitted by the display device 1100(S) is irradiated on the imaging element 310 by traveling downward from the display device 1100(S). A portion of the light incident on the imaging element 310 is reflected twice by the dihedral corner reflector 30 and emitted as the reflected light R. The window member 5320 is positioned to transmit the reflected light R reflected twice by the imaging element 310.

Light that is reflected only one time by the dihedral corner reflector 30 of the imaging element 310 and light that is not reflected by the dihedral corner reflector 30 escape toward the second surface 311*b* side through the spacing 23 between the adjacent reflector rows 22 shown in FIG. 6. Accordingly, the imaging element 310 does not emit light other than the twice-reflected light toward the first surface 311*a* side. In the image display device 5000 according to the embodiment, the spacing 23 between the adjacent reflector rows 22 is provided in the imaging element 310 because the display device 1100(S) used as the light source is located in the normal direction of the first surface 311*a* of the imaging element 310.

In the example, a light-shielding member 5310 is provided at the bottom surface inside the housing 5300 so that the light that escapes toward the second surface 311*b* side does not become stray light by being re-reflected inside the housing 5300. The light-shielding member 5310 also is provided at the sidewall surface inside the housing 5300. Similarly to the light-shielding member 1310 shown in FIG. 1, the light-shielding member 5310 may be, for example, a coated film of a black coating material formed at the bottom surface and wall surface of the housing 5300. The light-shielding member 5310 is sufficiently thin compared to the thickness of the constituent material of the housing 5300 and is therefore illustrated as a surface inside the housing 5300 in FIG. 26.

In the image display device 5000, the imaging element 310 emits only the twice-reflected light R of the incident light L, and does not reflect other light toward the first surface 311*a* side, etc. Therefore, as described with reference to FIG. 14, the imaging element 310 reduces the formation of ghost images other than the real image at the first surface 311*a* side.

Figure 27:
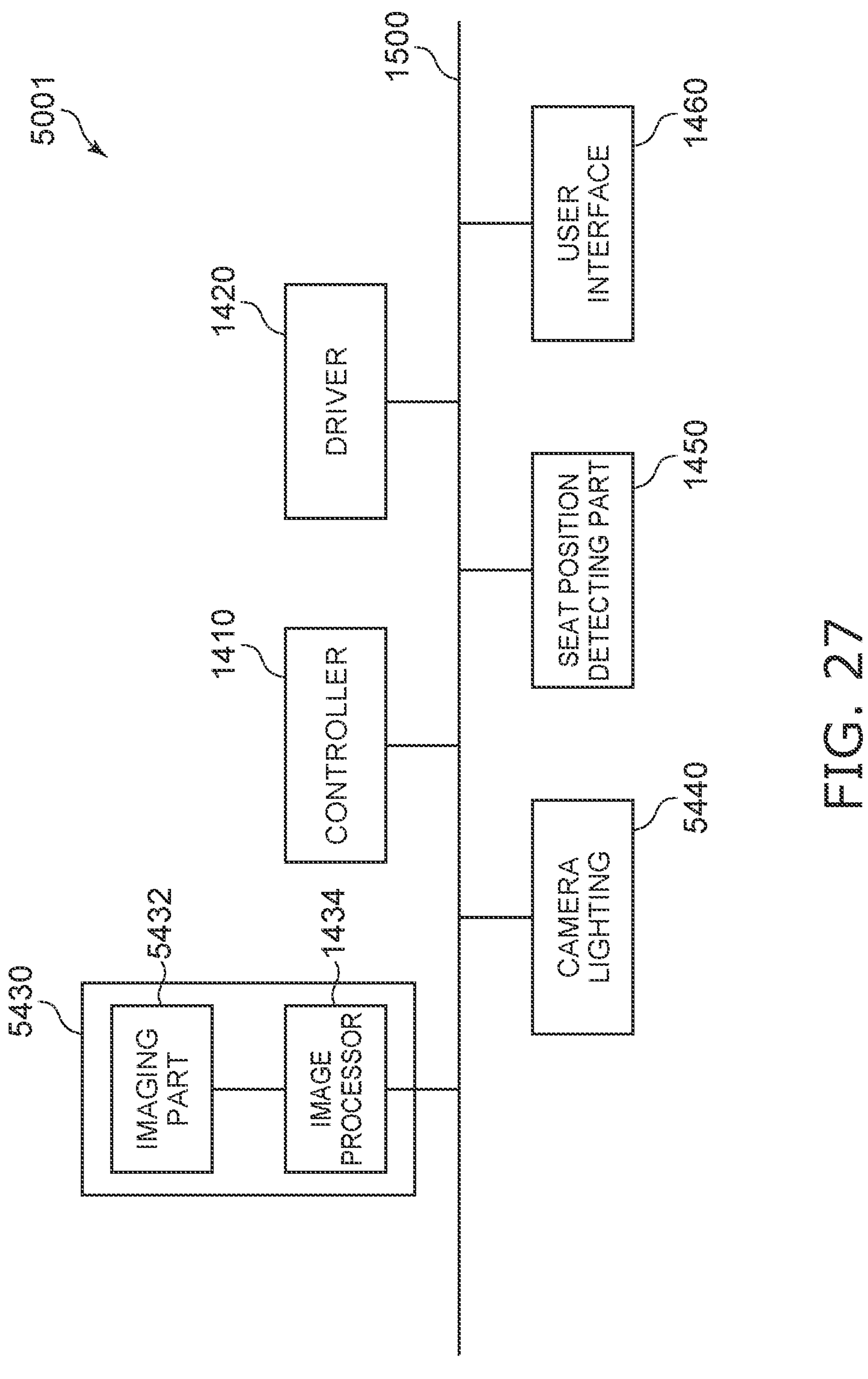
FIG. 27 is an example of a block diagram for describing an operation of the image display device according to the fifth embodiment.

FIG. 27 is an example of a block diagram for describing an operation of the image display device according to the fifth embodiment.

As shown in FIG. 27, a control system 5001 of the image display device 5000 includes a position detecting part 5430, the camera lighting 5440, the controller 1410, the driver 1420, the seat position detecting part 1450, and the user interface 1460. The position detecting part 5430 includes the imaging part 5432 and the image processor 1434. The image processor 1434 calculates the pupil position of the observer O5 based on image data acquired by the imaging part 5432.

The position detecting part 5430, the camera lighting 5440, the controller 1410, the driver 1420, the seat position detecting part 1450, and the user interface 1460 are communicatably connected via the communication network 1500. The controller 1410, the driver 1420, the seat position detecting part 1450, and the user interface 1460 are similar to those of the image display device 1000 according to the first embodiment, and a repeated detailed description is omitted.

In the control system 5001 of the image display device 5000 according to the embodiment, the controller 1410 operates the position detecting part 5430 and the camera lighting 5440 via the communication network 1500. The image display device 5000 according to the embodiment is similar to the image display device 1000 according to the first embodiment other than the position detecting part 5430 and the camera lighting 5440 imaging the observer O5 with light of a wavelength in a different range from the wavelength of the light emitted by the display device 1100(S).

Effects of the image display device 5000 according to the embodiment will now be described.

In the image display device 5000 according to the embodiment, the camera lighting 5440 radiates light of a wavelength in a different range from the wavelength of the light L emitted by the display device 1100(S). Also, the position detecting part 5430 images the observer O5 with the imaging part 5432 that responds to the light of the wavelength of the different range from the wavelength of the light L emitted by the display device 1100(S). Therefore, the image data that includes the information related to the pupil position of the observer O5 is not easily affected by the light emitted by the display device 1100(S). The position detecting part 5430 can calculate the pupil position of the observer O5 in an environment of reduced noise effects, and a more accurate value can be calculated.

In the image display device 5000 according to the embodiment, the display device 1100(S) that is the light source is located directly above the imaging element 310. Therefore, the imaging element 310 emits only twice-reflected light of the light L emitted from the display device 1100(S) as the reflected light R for forming a floating image I5. Therefore, the imaging element 310 does not radiate light other than the floating image I5 that causes false images and/or ghosts at the first surface 311*a* side.

The arrangement of the display device and the imaging element is applicable to the image display devices 1000 to

4000 according to the other embodiments described above. In other words, in the image display devices 1000 to 4000, the display device can be located directly above the imaging element, thereby reducing the radiation of light forming false images and/or ghosts at the first surface side of the imaging element.

Although six-axis control of one of the display device or the imaging element is performed in the specific examples described above, the control is not limited thereto, and the position at which the floating image is formed may be modified by six-axis control of both the display device and the imaging element. Also, the modification of the position at which the floating image is formed is not limited to a six-axis control of one or both of the display device and the imaging element. When the position at which the observer views the floating image or the position at which the floating image is formed is in a more limited range, etc., the control may use a portion of the degrees of freedom of six-axis control.

The embodiments described above are applicable in appropriate combinations.

The invention claimed is:

1. An image display device comprising:

an imaging element configured to form a floating image;

a light source configured to irradiate, toward the imaging element, light forming the floating image;

a position detecting part configured to detect an observation position of an observer observing the floating image;

a driver configured to modify an orientation of an emission of light of at least one of the imaging element or the light source; and a controller configured to control the driver to form the floating image according to the observation position; wherein:

the imaging element comprises either:

a base member, and a reflector array provided on the base member, the base member including a first surface and a second surface positioned at a side opposite to the first surface, or a base member comprising a reflector array, the base member including a first surface and a second surface positioned at a side opposite to the first surface;

the reflector array includes a plurality of reflector rows, the plurality of reflector rows including a plurality of dihedral corner reflectors arranged along a first direction;

each of the plurality of dihedral corner reflectors includes:

a first reflecting surface configured to reflect light from a first surface side, and a second reflecting surface orthogonal to the first reflecting surface and configured to reflect a reflected light from the first reflecting surface toward the first surface side;

in each of the plurality of reflector rows, an angle between (i) a straight line at which the first reflecting surface and the second reflecting surface meet and (ii) a plane in which the first direction and a second direction intersecting the first direction extend, is greater than 0° or less than 90°;

an angle between the first reflecting surface and the plane is greater than 45° and less than 90°;

the plurality of reflector rows include a first reflector row in which the angle between the straight line and the plane is a smallest value among those of the plurality of reflector rows; and reflector rows other than the first reflector row are configured such that angles between the straight line and the plane increase away from the first reflector row in the second direction.

2. The device according to claim 1, wherein the position detecting part comprises:

an imaging part acquiring first image data, the first image data including an eye of the observer, and an image processor detecting a position of the eye of the observer within the observation position by performing image processing of the first image data.

3. The device according to claim 2, further comprising:

a housing that houses the imaging element and the light source; wherein:

the imaging part is located inside the housing.

4. The device according to claim 3, wherein:

the housing includes a window member configured to transmit light emitted from the imaging element; and the imaging part is configured to acquire the first image data via the window member.

5. The device according to claim 3, wherein:

the base member is light-transmissive; and the imaging part is configured to acquire the first image data via the base member.

6. The device according to claim 2, wherein:

the imaging part is configured to acquire the first image data in a first period, the light source is configured to irradiate light toward the imaging element in a second period that does not overlap the first period.

7. The device according to claim 3, further comprising:

a half mirror located between the observation position and the imaging element; wherein:

the imaging part is configured to image a reflected image of the observer visible in the half mirror.

8. The device according to claim 3, further comprising:

an illumination light source configured to irradiate light toward the observation position; wherein:

the illumination light source is configured to irradiate light of a first wavelength that is different from a wavelength of the light emitted by the light source; and the imaging part is configured to acquire the first image data of the observation position on which the light of the first wavelength is irradiated.

9. The device according to claim 8, wherein:

a peak wavelength of the first wavelength is not less than 700 nm.

10. The device according to claim 2, wherein:

the position detecting part comprises a seat position detecting part configured to acquire information of a position of a seat on which the observer is seated; and the controller is configured to correct the observation position based on information of the position of the seat acquired by the seat position detecting part.

11. The device according to claim 2, wherein:

the position detecting part comprises a sound collector configured to collect a voice of the observer; and the controller is configured to correct the observation position based on data collected by the sound collector.

12. The device according to claim 2, further comprising:

an authentication processor configured to:

extract observer information identifying the observer by performing image processing of second image data, and authenticate the observer by searching for the observer information in a database;

the second image data includes at least a portion of the observer acquired by the imaging part;

the database includes user identification information identifying users including the observer;

the light source is configured to irradiate light toward the imaging element when the authentication processor authenticates the observer, and the controller is configured to control the driver when the authentication processor authenticates the observer.

13. The device according to claim 12, wherein:

the user identification information includes at least one of face authentication data, iris authentication data, fingerprint authentication data, or vein authentication data associated with an identification symbol for each of the users.

14. The device according to claim 1, wherein:

the light source comprises:

a substrate, and a plurality of semiconductor light-emitting elements located on the substrate.

15. An image display device comprising:

an imaging element configured to form a floating image;

a light source configured to irradiate, toward the imaging element, light forming the floating image;

a position detecting part configured to detect an observation position of an observer observing the floating image;

a driver configured to modify an orientation of an emission of light of at least one of the imaging element or the light source; and a controller configured to control the driver to form the floating image according to the observation position; wherein:

the imaging element comprises either:

a base member, and a reflector array provided on the base member, the base member including a first surface and a second surface positioned at a side opposite to the first surface, or a base member comprising a reflector array, the base member including a first surface and a second surface positioned at a side opposite to the first surface;

the reflector array includes a plurality of reflector rows, the plurality of reflector rows including a plurality of dihedral corner reflectors arranged along a first direction;

the plurality of reflector rows are arranged in a second direction to be parallel to each other with a spacing therebetween, the second direction intersecting the first direction, the plurality of dihedral corner reflectors each include:

a first reflecting surface configured to reflect light from a first surface side, and a second reflecting surface orthogonal to the first reflecting surface and configured to reflect a reflected light reflected from the first reflecting surface toward the first surface side, wherein in each of the plurality of reflector rows, an angle between (i) a straight line at which the first reflecting surface and the second reflecting surface meet and (ii) a plane in which the first direction and the second direction intersect, is greater than 0° and less than 90°, an angle between the first reflecting surface and the plane is greater than 45° and less than 90°;

the plurality of reflector rows include a first reflector row in which the angle between the straight line and the plane is a smallest value among those of the plurality of reflector rows, reflector rows other than the first reflector row are configured such that angles between the straight line and the plane increase away from the first reflector row in one direction along the second direction.

* * * * *